United States Patent
Imura

(10) Patent No.: US 7,151,600 B2
(45) Date of Patent: Dec. 19, 2006

(54) CALIBRATION SYSTEM FOR A SPECTRAL LUMINOMETER AND A METHOD FOR CALIBRATING A SPECTRAL LUMINOMETER

(75) Inventor: Kenji Imura, Toyohashi (JP)

(73) Assignee: Konica Minolta Sensing, Inc., Osaka (JP)

( * ) Notice: Subject to any disclaimer, the term of this patent is extended or adjusted under 35 U.S.C. 154(b) by 483 days.

(21) Appl. No.: 10/733,370

(22) Filed: Dec. 12, 2003

(65) Prior Publication Data

US 2005/0018184 A1    Jan. 27, 2005

(30) Foreign Application Priority Data

Jul. 25, 2003   (JP) ............................ 2003-201726

(51) Int. Cl.
*G01J 3/00* (2006.01)
*G01J 3/18* (2006.01)
(52) U.S. Cl. .................. 356/326; 356/300; 356/328
(58) Field of Classification Search .............. 356/300, 356/326, 328
See application file for complete search history.

(56) References Cited

FOREIGN PATENT DOCUMENTS

| JP | 63-006426 | 1/1988 |
| JP | 04-106430 | 4/1992 |
| JP | 06-058817 | 3/1994 |
| JP | 6-74823 A | 3/1994 |
| JP | 2002-116087 A | 4/2002 |
| JP | 2003-060291 A | 2/2003 |
| JP | 2003-090761 A | 3/2003 |
| JP | 2003-188468 | 7/2003 |

*Primary Examiner*—F. L. Evans
(74) *Attorney, Agent, or Firm*—McDermott Will & Emery LLP

(57) ABSTRACT

A calibration light source outputs emission lines having a known emission-line wavelength, a spectral luminometer to be calibrated measures an emission-line output of the calibration light source, and a system control unit calibrates the wavelength of the spectral luminometer by estimating the wavelength of the emission-line output from ratios of outputs of a light receiving unit at a plurality of measurement wavelengths neighboring an emission-line wavelength and estimating a wavelength change amount from a difference between the estimated wavelength of the emission-line output and the known emission-line wavelength. The wavelength and the sensitivity of a spectral luminometer can be calibrated at a user side.

23 Claims, 17 Drawing Sheets

CALIBRATION SYSTEM FOR A SPECTRAL LUMINOMETER AND A METHOD FOR CALIBRATING A SPECTRAL LUMINOMETER

This application is based on patent application No. 2003-201726 filed in Japan, the contents of which are hereby incorporated by references.

BACKGROUND OF THE INVENTION

This invention relates to a calibration system for a spectral luminometer for measuring and evaluating luminances and colors of various light sources and display devices and particularly to a calibration system for a spectral luminometer for a wavelength calibration and a spectral sensitivity calibration, and a method for calibrating a spectral luminometer.

Spectral luminometers for measuring and evaluating spectral luminances, luminances and colors of various light sources and display devices have been conventionally widely used (for example, see Japanese Unexamined Patent Publication No. H6-74823). FIG. 18 is a diagram showing a construction of a light splitting unit in a prior art spectral luminometer. As shown in FIG. 18, a light splitting unit 310 built in the prior art spectral luminometer is the so-called polychrometer in which an incident beam through an incident slit 311 is dispersed by a diffraction grating 313, and a dispersed image of the incident slit 311 is formed on a light receiving sensor array 314 by a imaging optical system 312. This polychrometer simultaneously measures an intensity distribution of all the wavelengths in a measurement range. FIG. 19 is a graph showing spectral sensitivities of light receiving sensors $S_n$ (n=0 to 60) of the light receiving sensor array 314 of the polychrometer. The polychrometer shown in FIG. 19 has a half-width of 10 nm, and an interval between the sensors is 5 nm, and a wavelength range is from 400 to 700 nm. In FIG. 19, horizontal axis represents wavelength and vertical axis represents relative sensitivity. FIG. 19 shows only the relative sensitivities of the light receiving sensors $S_0$, $S_1$, $S_2$, $S_{30}$, $S_{58}$, $S_{59}$, $S_{60}$.

As shown in FIG. 19, middle wavelengths of the lights received by the light receiving sensors $S_n$ do not always coincide with wavelengths obtained by dividing the wavelength range 400 to 700 nm by 60. Accordingly, a wavelength calibration for the light splitting unit 310 is carried out by using a monochromatic light source whose wavelength is known and stable and giving the spectral sensitivities of the respective light receiving sensors of the light receiving sensor array 314.

Further, a sensitivity calibration for the light splitting unit 310 is carried out by measuring an output light of a standard light source whose spectral intensity distribution is known and stable and storing sensitivity correction coefficients for the respective light receiving sensors in a controller 401 beforehand, the sensitivity correction coefficients being calculated as ratios of outputs of the respective light receiving sensors of the light receiving sensor array 314 to outputs the respective light receiving sensors should make based on the spectral sensitivities calculated by the wavelength calibration.

As shown in FIG. 18, a relative position change of optical elements of the polychrometer directly and sharply leads to a wavelength error. Further, a sensitivity error is caused by a property change of an optical element such as a reflection efficiency of the diffraction grating 313 and a circuit construction. This is also caused by the aforementioned wavelength error. Accordingly, occurrences of the wavelength error and the sensitivity error resulting from an over-the-time change or a thermal change are unavoidable and a recalibration is essential to maintain precision.

However, the recalibration to maintain the precision of the spectral luminometer requires the same facility and operation as the calibration at the time of production and, therefore, has been difficult to be done at a user side. Thus, a user needed to send the spectral luminometer back to a factory in order to have the spectral luminometer recalibrated. Such a recalibration made by sending the spectral luminometer back takes cost and time both at the producer side and at the user side and is difficult to do with a sufficient frequency. Further, in the case that a spare spectral luminometer is necessary as a substitution while the spectral luminometer is at the factory for the recalibration, and a cost therefor is also necessary.

SUMMARY OF THE INVENTION

It is an object of the present invention to provide a spectral luminometer calibration system and calibration method which are free from the problems residing in the prior art.

It is another object of the present invention to provide a spectral luminometer calibration system and calibration method which enable a user to calibrate the wavelength and sensitivity of the spectral luminometer.

A spectral luminometer is provided with a light receiver having photoelectric conversion elements for receiving lights produced by dispersing an incident light in accordance with wavelengths and outputting electrical signals corresponding to light intensities of the respective received wavelength components.

According to an aspect of the present invention, the wavelength of the spectral luminometer is calibrated by: outputting emission lines having a known emission-line wavelength from a calibration light source; measuring an emission-line output of the calibration light source by the spectral luminometer; estimating a wavelength of the emission-line output from relative outputs of the light receiver at a plurality of measurement wavelengths neighboring the emission-line wavelength; and estimating a wavelength change amount from a difference between the estimated wavelength of the emission-line output and the known emission-line wavelength.

According to another aspect of the present invention, the sensitivity of the spectral luminometer is calibrated by: estimating a spectral intensity distribution of an incandescent light source from outputs of a plurality of monitor sensors; measuring an output light of the incandescent light source by the spectral luminometer; estimating an output of the light receiver from the estimated spectral intensity distribution and the spectral sensitivities of the respective photoelectric conversion elements of the light receiver; calculating a ratio of the estimated output of the light receiver to an actual output of the light receiver for each photoelectric conversion element to calibrate the sensitivity of the spectral luminometer.

These and other objects, features and advantages of the present invention will become more apparent upon a reading of the following detailed description and accompanying drawings.

DETAILED DESCRIPTION OF THE PREFERRED EMBODIMENTS OF THE PRESENT INVENTION

Figure 1:
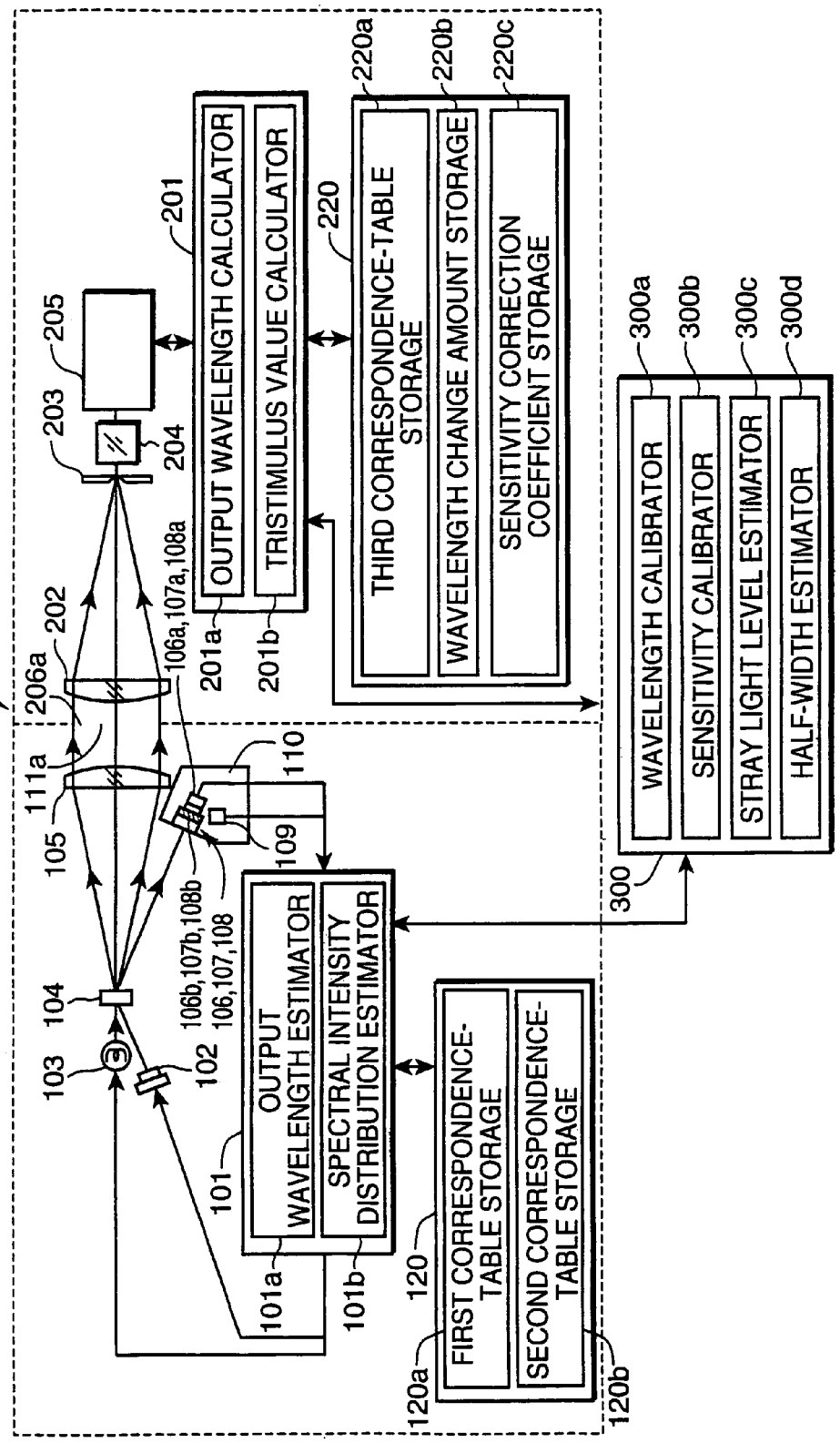
FIG. 1 is a diagram showing a construction of a calibration system for a spectral luminometer according to an embodiment of the invention.

Embodiments of the present invention are described with reference to the accompanying drawings. It should be noted that no description is given on the same construction by identifying it by the same reference numerals in the respective drawings.

Referring to FIG. 1 showing a construction of a calibration system for a spectral luminometer according to an embodiment of the invention, a calibration system 1 for a spectral luminometer is provided with a calibration light source 100, a spectral luminometer 200 to be calibrated and a system control unit 300 connected with the light source calibration 100 and the spectral luminometer 200.

The calibration light source 100 includes a controller 101, an emission-line light source 102, an incandescent light source 103, a diffusing plate 104, a collimating optical system 105, a first monitor sensor 106 (106a, 106b), a second monitor sensor 107 (107a, 107b), a third monitor sensor 108 (108a, 108b), a temperature sensor 109 and a storage 120.

The storage 120 is formed, for example, by an EEPROM (Electrically Erasable Programmable Read-Only Memory) and functions as a first correspondence-table storage 120a and a second correspondence-table storage 120b.

The first correspondence-table storage 120a stores a first correspondence table showing a correspondence of an output wavelength $\lambda_m$ and an output ratio $I_{10}/I_{20}$, which is a ratio of an output $I_{10}$ of the first monitor sensor 106 to an output $I_{20}$ of the second monitor sensor 107, for each temperature. The first correspondence table is described later.

The second correspondence-table storage 120b stores a second correspondence table showing an correspondence of a relative spectral intensity distribution $R(\lambda)$, an output ratio $I_{30}/I_{10}$, which is a ratio of an output $I_{30}$ of the third monitor sensor 108 to the output $I_{10}$ of the first monitor sensor 106, and an output ratio $I_{20}/I_{10}$, which is a ratio of the output $I_{20}$ of the second monitor sensor 107 to the output $I_{10}$ of the first monitor sensor 106, for each temperature. The second correspondence table is described later.

The controller 101 is formed, for example, by a CPU (Central Processing Unit) and functions as an output wavelength estimator 101a and a spectral intensity distribution estimator 101b.

The output wavelength estimator 101a estimates the output wavelength $\lambda_m$ of the emission-line light source 102 from an output ratio $I_1/I_2$, which is a ratio of an output $I_1$ of the first monitor sensor 106 to an output $I_2$ of the second monitor sensor 107, with reference to the first correspondence table stored in the first correspondence-table storage 120a.

The spectral intensity distribution estimator 101b selects a relative spectral intensity distribution $R(\lambda)$ of the incandescent light source 103 based on an output ratio $I_3/I_1$, which is a ratio of an output $I_3$ of the third monitor sensor 108 to the output $I_1$ of the first monitor sensor 106, with reference to the second correspondence table stored in the second correspondence-table storage 120b, and estimates a spectral intensity distribution $P(\lambda)$ based on the selected relative spectral intensity distribution $R(\lambda)$, the output $I_2$ of the second monitor sensor 107 and the output $I_{20}$ corresponding to the relative spectral intensity distribution $R(\lambda)$ in the second correspondence table. A specific method of calculating the spectral intensity distribution $P(\lambda)$ is described later.

The controller 101 controls emission timings and emission periods of the emission-line light source 102 and the incandescent light source 103.

The emission-line light source 102 is formed, for example, by a visible laser diode (semiconductor laser) for emitting a visible laser beam and outputs emission lines which are a light having a specified wavelength (emission-line wavelength). The incandescent light source 103 is formed, for example, by an incandescent light bulb and outputs a white light having a plurality of wavelengths.

The diffusing plate 104 diffuses an output light from the emission-line light source 102 and the one from the incandescent light source 103.

The collimating optical system 105 collects and converges the output light from the emission-line light source 102 and the one from the incandescent light source 103 diffused by the diffusing plate 104 into parallel lights.

The first, second and third monitor sensors 106, 107, 108 include silicon photodiodes 106a, 107a, 108a and glass filters 106b, 107b, 108b, respectively.

The first monitor sensor 106 monitors an output wavelength of the output light from the emission-line light source 102 diffused by the diffusing plate 104, wherein the glass filter 106b has such a spectral sensitivity as to rise near the output wavelength of the emission-line light source 102.

The second monitor sensor 107 monitors the output wavelength of the light emitted from the emission-line light source 102 diffused by the diffusing plate 104, wherein the glass filter 107b has such a spectral sensitivity as to fall near the output wavelength of the emission-line light source 102.

The third monitor sensor 108 monitors the output wavelength of the light emitted from the incandescent light source 103 diffused by the diffusing plate 104.

Figure 2:
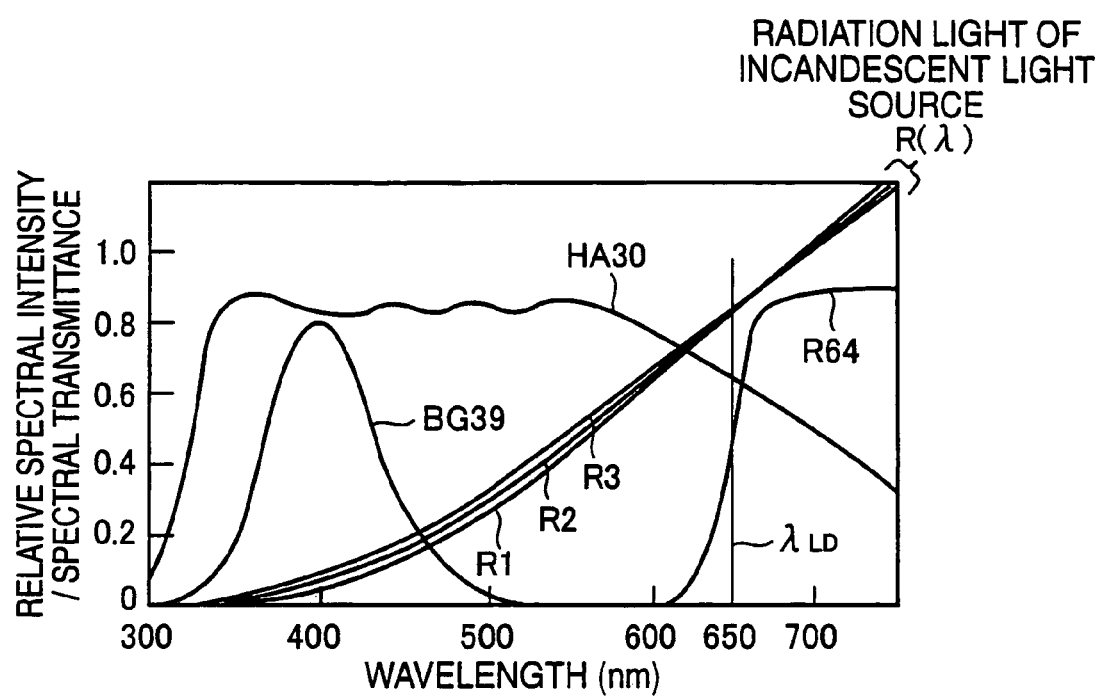
FIG. 2 is a graph showing a relative spectral intensity of a calibration light source and a spectral transmittance of a filter in a monitor sensor.

FIG. 2 is a graph showing a relative spectral intensity of the calibration light source and spectral transmittances of the filters of the monitor sensors, wherein vertical axis represents relative spectral intensity and spectral transmittance, and horizontal axis represents wavelength.

As shown in FIG. 2, the emission-line light source 102 emits a monochromatic light having an output wavelength $\lambda_{LD}$ of about 650 nm. The output wavelength has an individual difference of at maximum ±5 nm and has a large temperature dependence. Thus, the output wavelength of the emission-line light source 102 is monitored by the first and second monitor sensors 106, 107. Similarly, the spectral intensity distribution and the radiation intensity of the incandescent light source 103 have individual differences and change with time. Thus, the relative spectral intensity distribution of the output light of the incandescent light source 103 is monitored by the first, second and third sensor monitors 106, 107, 108.

An R-64 filter produced by Hoya Optics and having a spectral transmittance shown by R64 in FIG. 2 is, for example, used as the glass filter 106b of the first monitor sensor 106. This glass filter 106b has such a spectral transmittance as to rise near 650 nm which is the output wavelength of the emission-line light source 102. A HA-30 filter produced by Hoya Optics and having a spectral transmittance shown by HA30 in FIG. 2 is, for example, used as the glass filter 107b of the second monitor sensor 107. This glass filter 107b has such a spectral transmittance as to fall near 650 nm which is the output wavelength of the emission-line light source 102. Accordingly, the ratio $I_1/I_2$ of the output $I_1$ of the first monitor sensor 106 to the output $I_2$ of the second monitor sensor 107 decreases when the output wavelength $\lambda_{LD}$ is shifted toward a shorter wavelength side while increasing when it is shifted toward a longer wavelength side. Particularly in this embodiment, since a curve R64 representing a characteristic of the spectral transmittance of the glass filter 106b suddenly rises as shown in FIG. 2, the glass filter 106b has a high sensitivity to a wavelength shift. The first correspondence table showing the correspondence between the ratio $I_{10}/I_{20}$ of the output $I_{10}$ of the first monitor sensor 106 to the output $I_{20}$ of the second monitor sensor 107 and the output wavelength $\lambda_m$ of the emission-line light source 102 is stored in the storage 120. The controller 101 calculates the ratio $I_1/I_2$ of the output $I_1$ of the first monitor sensor 106 to the output $I_2$ of the second monitor sensor 107 and calculates an estimated value $\Lambda_{LD}$ of the output wavelength of the emission-line light source 102 based on the calculated ratio $I_1/I_2$ with reference to the first correspondence table.

Changes in the spectral intensity distribution of the output light of the incandescent light source 103 include changes in the relative spectral intensity distribution and those in the radiation intensity. In order to monitor the relative spectral intensity distribution, a BG-39 filter produced by Hoya Optics and having a spectral transmittance shown by BG39 in FIG. 2 is, for example, used as the glass filter 108b of the third monitor sensor 108. This glass filter 108b has such a spectral transmittance as to peak near 390 nm.

The relative spectral intensity distribution $R(\lambda)$ of the output light of the incandescent light source 103 depends on the color temperature of a filament of the incandescent light bulb. Specifically, the relative spectral intensity distribution $R(\lambda)$ is expressed by a characteristic curve R1 shown in FIG. 2 in the case of a color temperature of 2700 (Kelvin), by a characteristic curve R2 shown in FIG. 2 in the case of a color temperature of 2800 (Kelvin), and by a characteristic curve R3 shown in FIG. 2 in the case of a color temperature of 2900 (Kelvin). Since the ratio $I_3/I_1$ of the output $I_3$ of the third monitor sensor 108 to the output $I_1$ of the first monitor sensor 106 changes in relation to the relative spectral intensity distribution $R(\lambda)$, the radiation spectral intensity distribution of the incandescent light source 103 during the calibration can be estimated based on this ratio $I_3/I_1$. The second correspondence table showing the correspondence between the relative spectral intensity distributions $R(\lambda)$ when the incandescent light source 103 of the calibration light source 100 is turned on at a plurality of different color temperatures, the corresponding ratios $I_{30}/I_{10}$ of the outputs 130 of the third monitor sensor 108 to the outputs $I_{10}$ of the first monitor sensor 106, and the corresponding outputs $I_{20}$ of the second monitor sensor 107 is stored in the storage 120. The controller 101 calculates the ratio $I_3/I_1$ of the output $I_3$ of the third monitor sensor 108 to the output $I_1$ of the first monitor sensor 106, and estimates the relative spectral intensity distribution $R(\lambda)$ at the time of calibrating the output light of the incandescent light source 103 based on the calculated ratio $I_3/I_1$ with reference to the second correspondence table. Then, the controller 101 calculates the spectral intensity distribution $P(\lambda)$ based on the estimated relative spectral intensity distribution $R(\lambda)$, the output $I_2$ of the second monitor sensor 107 at the time of calibrating the output light of the incandescent light source 103, and the output $I_{20}$ of the second monitor sensor 107 stored beforehand in the storage 120 in accordance with following equation (1):

$$P(\lambda)=R(\lambda)\cdot I_2/I_{20} \quad (1)$$

As shown in FIG. 2, the second monitor sensor 107 has a sensitivity over the entire visible range (380 to 780 nm) measurable by the spectral luminometer, and suited to monitoring the radiation intensity.

The aforementioned method for monitoring the spectral intensity distribution of the incandescent light source 103 premises that the change in the relative spectral intensity distribution $R(\lambda)$ of the incandescent light source 103 depends only on the color temperature of the filament. Specifically, this premise holds for the changes in the relative spectral intensity distribution $R(\lambda)$ caused by the thinning of the filament of the incandescent light source 103 and a change in an applied voltage, but it does not hold for the changes in the relative spectral intensity distribution $R(\lambda)$ caused by the deposition of the filament on the bulb and the yellowing of the diffusing plate 104. In other words, since the relative ratios of the outputs $I_1$, $I_2$, $I_3$ of the three monitor sensors 106, 107, 108 do not change as long as the above premise holds, the ratio $I_{20}/I_{10}$ of the output $I_{20}$ of the second monitor sensor 107 to the output $I_{10}$ of the first monitor sensor 106 at the time of setting is further stored in the storage 120 while being related to the relative spectral intensity distribution $R(\lambda)$ of the second correspondence table. The controller 101 can monitor an abnormality of the incandescent light source 103 by calculating the ratio $I_2/I_1$ of the output 12 of the second monitor sensor 107 to the output $I_1$ of the first monitor sensor 106 and confirming that the calculated ratio $I_2/I_1$ has not changed from the ratio $I_{20}/I_{10}$ at the time of setting, which ratio is stored in the storage 120 beforehand.

Referring back to FIG. 1, the temperature sensor 109 is formed, for example, by a thermistor and compensates for the temperatures of the first, second and third monitor sensors 106, 107, 108. The temperature sensor 109 measures the temperatures of the first, second and third monitor sensors 106, 107, 108. The spectral transmittances of the glass filters 106b, 107b, 108b of the respective monitor sensors 106, 107, 108 have a temperature dependency. For example, the rise of the spectral transmittance of the glass filter 106b is shifted toward the longer wavelength side by slightly over 0.1 nm/C°. In order to compensate for errors caused by the temperature changes of the glass filters 106b, 107b, 108b, a plurality of first correspondence tables and a plurality of second correspondence tables are prepared for different temperatures of the monitor sensors 106, 107, 108. Thus, the controller 101 refers to the first correspondence table and the second correspondence table corresponding to the temperatures of the monitor sensors 106, 107, 108 measured by the temperature sensor 109.

It should be noted that the first, second and third monitor sensors 106, 107, 108 and the temperature sensor 109 are provided in an aluminum block 110.

Figure 3:
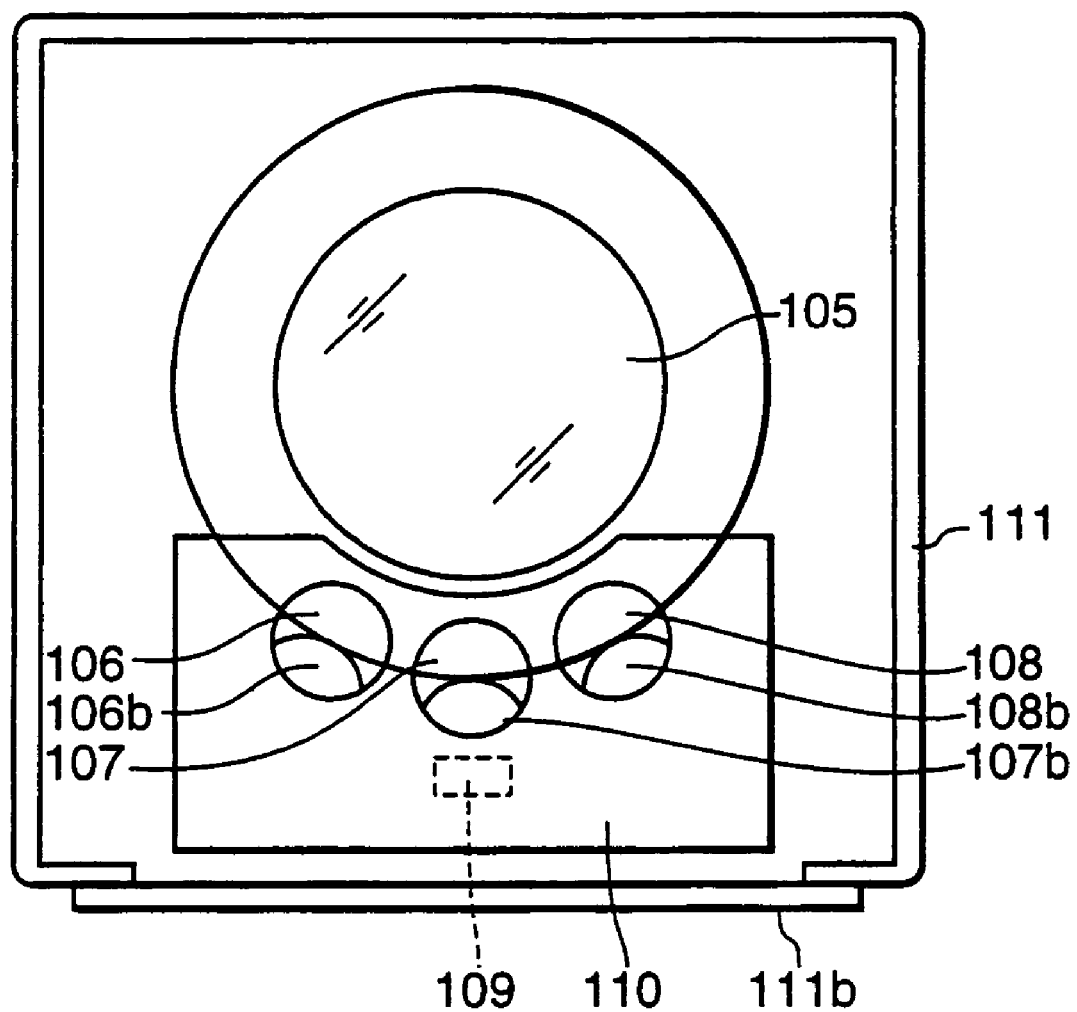
FIG. 3 is a diagram showing a collimating optical system and the monitor sensors of the calibration light source when viewed from a diffusing plate.

FIG. 3 is a diagram showing the collimating optical system 105 and the monitor sensors 106 to 108 of the calibration light source 100 when viewed from the diffusing plate 104. As shown in FIG. 3, when the collimating optical system 105 and the monitor sensors 106 to 108 are viewed from the diffusing plate 104, the aluminum block 110 is disposed below the collimating optical system 105. In the aluminum block 110, the second monitor sensor 107 is placed below the collimating optical system 105; the first monitor sensor 106 is placed at the left side of the second monitor sensor 107; the third monitor sensor 108 is placed at the right side of the second monitor sensor 107; and the temperature sensor 109 is placed below the second monitor sensor 107.

Referring back to FIG. 1, the spectral luminometer 200 to be calibrated includes a controller 201, a converging optical system 202, a diaphragm 202, a condenser lens 204, a light receiving unit 205 and a storage 220.

The storage 220 is formed, for example, by an EEPROM and functions as a third correspondence-table storage 220a, a wavelength change amount storage 220b and a sensitivity correction coefficient storage 220c.

The third correspondence-table storage 220a stores a third correspondence table showing a correspondence of the output wavelengths $\lambda_m$ and output ratios $Q_n/Q_{n+2}$ corresponding to the emission-line wavelengths. The third correspondence table is described later.

The wavelength change amount storage 220b stores a difference between the wavelength of the emission-line output and the emission-line wavelength estimated by the output wavelength estimator 101a as a wavelength change amount. This wavelength change amount is used for the wavelength calibration at the time of a measurement by the spectral luminometer 200.

The sensitivity correction coefficient storage 220c stores ratios $q_n/Q_n$ of estimated outputs qn to be obtained from the respective light receiving sensors $S_n$ calculated based on the spectral intensity distribution $P(\lambda)$ estimated by the spectral intensity distribution estimator 101b and the spectral sensitivities of the respective light receiving sensors $S_n$ obtained from the spectral luminometer 200 to outputs $Q_1$ actually obtained from the light receiving sensors $S_n$ as sensitivity correction coefficients. The sensitivity correction coefficients are used for the sensitivity calibration at the time of a measurement by the spectral luminometer 200.

The controller 201 is formed, for example, by a CPU and functions as an output wavelength calculator 201a and a tristimulus value calculator 201b.

The output wavelength calculator 201a selects a ratio $Q_n/Q_{n+2}$ closest to "1" from three output ratios $Q_n/Q_{n+2}$ in the case of measuring the emission-line wavelength of the calibration light source 100, and calculates a wavelength $\lambda_m$ corresponding to the selected ratio $Q_n/Q_{n+2}$ with reference to the third correspondence table stored in the third correspondence storage 220a.

The tristimulus value calculator 201b corrects weight coefficients according to the wavelength change amount and calculates tristimulus values using the corrected weight coefficients in the case of calculating the tristimulus values by a sum product of the outputs of the light receiving sensors $S_n$ at each measurement wavelength and the weight coefficients for each measurement wavelength.

The converging optical system 202 converges the light collimated by the collimating optical system 105 of the calibration light source 100 to an opening of the diaphragm 203.

The diaphragm 203 specifies a receiving angle of a measurement beam together with the converging optical system 202.

The condenser lens 204 collects the light having passed through the diaphragm 203 to an incident slit of the light receiving unit 205.

The light receiving unit 205 includes a diffraction grating for dispersing the incident light according to the wavelength, and a light receiving sensor array in which a plurality of photoelectric conversion elements (light receiving sensors $S_n$) for receiving the light dispersed in different directions at the respective wavelengths by the diffraction grating and outputting electrical signals corresponding to the light intensities of the respective wavelength components of the received light are arrayed.

At the time of a calibration, a housing 111 of the calibration light source 100 and a housing 206 of the spectral luminometer 200 are coupled by connecting an opening 111a formed in the housing 111 and an opening 206a formed in the housing 206 in order to prevent the entrance of an external light.

The system control unit 300 is formed, for example, by a CPU and functions as a wavelength calibrator 300a, a sensitivity calibrator 300b, a stray-light level estimator 300c and a half-width estimator 300d.

The wavelength calibrator 300a corrects the wavelength by estimating the wavelength of the emission-line output based on the ratios of the outputs from the light receiving sensors $S_n$ at a plurality of measurement wavelengths neighboring the emission-line wavelength, calculating the wavelength change amount based on the estimated wavelength of the emission-line output and a known emission-line wavelength, and storing the calculated wavelength change amount in the storage 220 of the spectral luminometer 200 in the case that the spectral luminometer 200 measures the emission-line output of the calibration light source 100.

The sensitivity calibrator 300b calibrates the sensitivity of the spectral luminometer 200 by calculating the estimated outputs $q_n$ to be obtained from the respective light receiving sensors $S_n$ based on the spectral intensity distribution $P(\lambda)$ estimated by the spectral intensity distribution estimator 101b and the spectral sensitivities of the respective light receiving sensors $S_n$ obtained from the spectral luminometer 200, calculating the ratio $q_n/Q_n$ of the calculated estimated output $I_1$ to the output $I_1$ actually obtained from the light receiving sensor $S_n$ for each light receiving sensor $S_n$, and storing the calculated ratios $q_n/Q_n$ in the storage 220 of the spectral luminometer 200 in the case that the spectral luminometer 200 measures the emission-line output of the calibration light source 100.

The stray-light level estimator 300c estimates a change in the stray-light level of the spectral luminometer 200 by calculating ratios of the intensities of the emission lines obtained based on the outputs from the respective light receiving sensors $S_n$ at a plurality of measurement wavelengths neighboring the emission-line wavelength to the outputs of the light receiving sensors $S_n$ at a wavelength where the light receiving sensors $S_n$ have no sensitivity to the emission-line wavelength (outputs of the light receiving sensors $S_n$ having a spectral sensitivity of 0 at the emission-line wavelength), and comparing the calculated ratios with initial values of the ratios stored beforehand.

The half-width estimator 300d estimates a change in the half-width of the spectral luminometer 200 by calculating the half-widths of the light receiving sensors $S_n$ near the emission-line wavelength based on the outputs of the light receiving sensors $S_n$ at a plurality of measurement wavelengths neighboring the emission-line wavelength and comparing the calculated half-widths with initial values of the half-widths stored beforehand.

The wavelength recalibration of the spectral luminometer 200 is described. The spectral luminometer 200 measures a light emitted from the emission-line light source 102 of the calibration light source 100 upon receiving an instruction from the system control unit 300.

Figure 4:
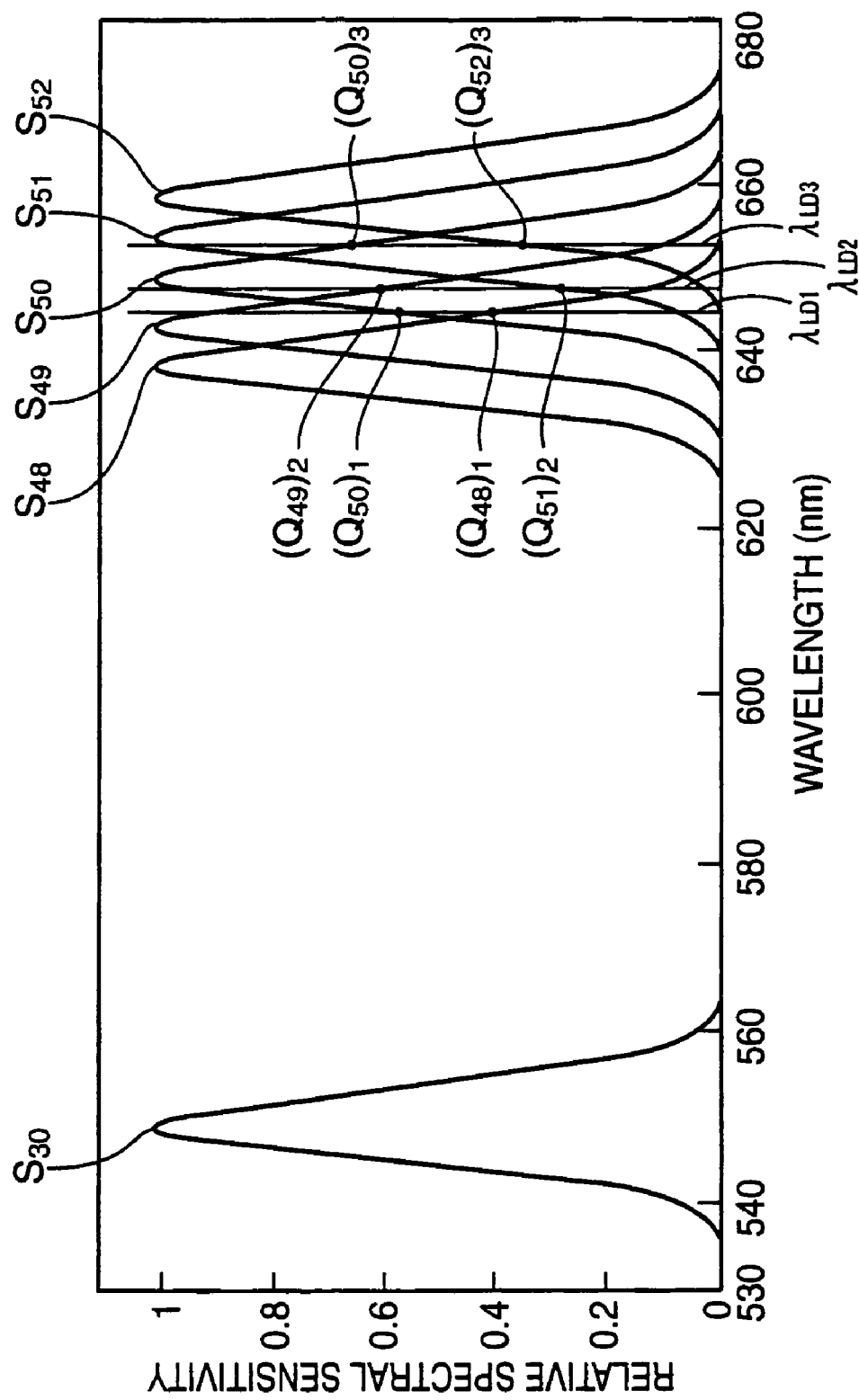
FIG. 4 is a graph showing an emission-line wavelength of an emission-line light source and relative spectral sensitivities of five light receiving sensors near the emission-line wavelength.

FIG. 4 is a graph showing relative spectral sensitivities of five light receiving sensors $S_n$ (n=48 to 52) at the emission-line wavelength of the emission-line light source 102 and wavelengths neighboring the emission-line wavelength. As described above, the output wavelength of the emission-line light source 102 varies within a range of 650±5 nm. In FIG. 4, three emission-line wavelengths $\lambda_{LD1}$, $\lambda_{LD2}$, $\lambda_{LD3}$ are shown. For example, in the case that the output wavelength $\lambda_{LD}$ of the emission-line light source 102 of the calibration light source 100=$\lambda_{LD1}$, the spectral sensitivity of the light receiving sensor $S_{48}$ neighboring at the shorter wavelength side falls near $\lambda_{LD1}$, whereas the spectral sensitivity of the light receiving sensor $S_{50}$ neighboring at the longer wavelength side rises near $\lambda_{LD1}$. Thus, a ratio $Q_{48}/Q_{50}$ of an output $(Q_{48})_1$ of the light receiving sensor $S_{48}$ to an output $(Q_{50})_1$ of the light receiving sensor $S_{50}$ increases at a high sensitivity if the output wavelength $\lambda_{LD}$ is shifted toward the shorter wavelength side while decreasing at a high sensitivity if it is shifted toward the longer wavelength side. Accordingly, the controller 201 of the spectral luminometer 200 calculates the ratio $Q_{48}/Q_{50}$ of the output $(Q_{48})_1$ of the light receiving sensor $S_{48}$ to the output $(Q_{50})_1$ of the light receiving sensor $S_{50}$, estimates the output wavelength $\lambda_{LD}$ of the emission-line light source 102 with reference to the third correspondence table stored in the storage 220, and outputs the estimated output wavelength $\lambda_{LD}$ to the system control unit 300. The system control unit 300 corrects the output wavelength by calculating a wavelength change amount $d\lambda = \lambda_{LD} - \Lambda_{LD}$ of the light receiving unit 205 of the spectral luminometer 200 based on a difference between the estimated value $\lambda_{LD}$ inputted from the controller 201 of the spectral luminometer 200 and an estimated value $\Lambda_{LD}$ of the emission-line wavelength inputted from the controller 101 of the calibration light source 100 and storing it in the storage 220 as a common correction amount for the spectral sensitivities of the respective light receiving sensors $S_n$ of the light receiving unit 205 of the spectral luminometer 200.

The spectral sensitivities of two of a plurality of light receiving sensors $S_n$ (n=48 to 52) for calculating the ratio preferably sharply change in opposite directions at the output wavelength $\lambda_{LD}$ of the emission-line light source 102, and the combination of the two light receiving sensors differs depending on the position of the output wavelength $\lambda_{LD}$. Specifically, in the case that the output wavelength $\lambda_{LD}$ of the emission-line light source 102 of the calibration light source 100=$\lambda_{LD2}$ in FIG. 4, it is preferable to calculate a ratio $Q_{49}/Q_{51}$ of an output $(Q_{49})_1$ of the light receiving sensor $S_{49}$ to an output $(Q_{51})_1$ of the light receiving sensor $S_{50}$. In the case that the output wavelength $\lambda_{LD}$ of the emission-line light source 102 of the calibration light source 100=$\lambda_{LD3}$ in FIG. 4, it is preferable to calculate a ratio $Q_{50}/Q_{52}$ of the output $(Q_{50})_1$ of the light receiving sensor $S_{50}$ to an output $(Q_{52})_1$ of the light receiving sensor $S_{52}$. Thus, three ratios $Q_{48}/Q_{50}$, $Q_{49}/Q_{51}$, $Q_{50}/Q_{52}$ corresponding to the respective emission-line wavelengths are prepared in the third correspondence table stored in the storage 220, and the output wavelength $\lambda_{LD}$ of the emission-line light source 102 is estimated using a most suitable one of the calculated ratios $Q_{48}/Q_{50}$, $Q_{49}/Q_{51}$, $Q_{50}/Q_{52}$ at the time of the calibration. Specifically, the controller 201 estimates the output wavelength $\lambda_{LD}$ of the emission-line light source 102 using the ratio closest to "1" among the three ratios $Q_{48}/Q_{50}$, $Q_{49}/Q_{51}$, $Q_{50}/Q_{52}$.

Next, the recalibration of the spectral sensitivity of the spectral luminometer 200 is described. After the output wavelength is recalibrated as above, the spectral luminometer 200 measures an output light of the incandescent light source 103 of the calibration light source 100 upon receiving an instruction from the system control unit 300. The spectral luminometer 200 sends the output (spectral sensitivities) $Q(\lambda)$ of the light receiving unit 205 at each wavelength to the system control unit 300. The system control unit 300 corrects the spectral sensitivity of the spectral luminometer 200 by calculating the outputs $q_1$ estimated to be obtained from the respective light receiving sensors $S_n$ based on the spectral intensity distribution $P(\lambda)$ inputted from the controller 101 of the calibration light source 100, the spectral sensitivities $Q(\lambda)$ of the respective light receiving sensors $S_n$ of the light receiving unit 205 inputted from the controller 201 of the spectral luminometer 200 and the aforementioned wavelength change amount $d\lambda$, calculating the ratio $q_n/Q_n$ of the calculated estimated output $q_1$ to the actually measured value $Q_n$ for each light receiving sensor $S_n$, and storing the calculated ratios $q_n/Q_n$ in the controller 201 of the spectral luminometer 200.

For the calibration of the output wavelength and the spectral sensitivity of the spectral luminometer 200, the correspondence table for monitoring the output wavelength of the emission-line light source 102 (first correspondence table) and the correspondence table for monitoring the radiation light of the incandescent light source 103 (second correspondence table) need to be set beforehand in the calibration light source 100, and the correspondence table for the wavelength calibration (third correspondence table) needs to be set in the spectral luminometer 200. Procedures of setting these correspondence tables are described below.

Figure 5:
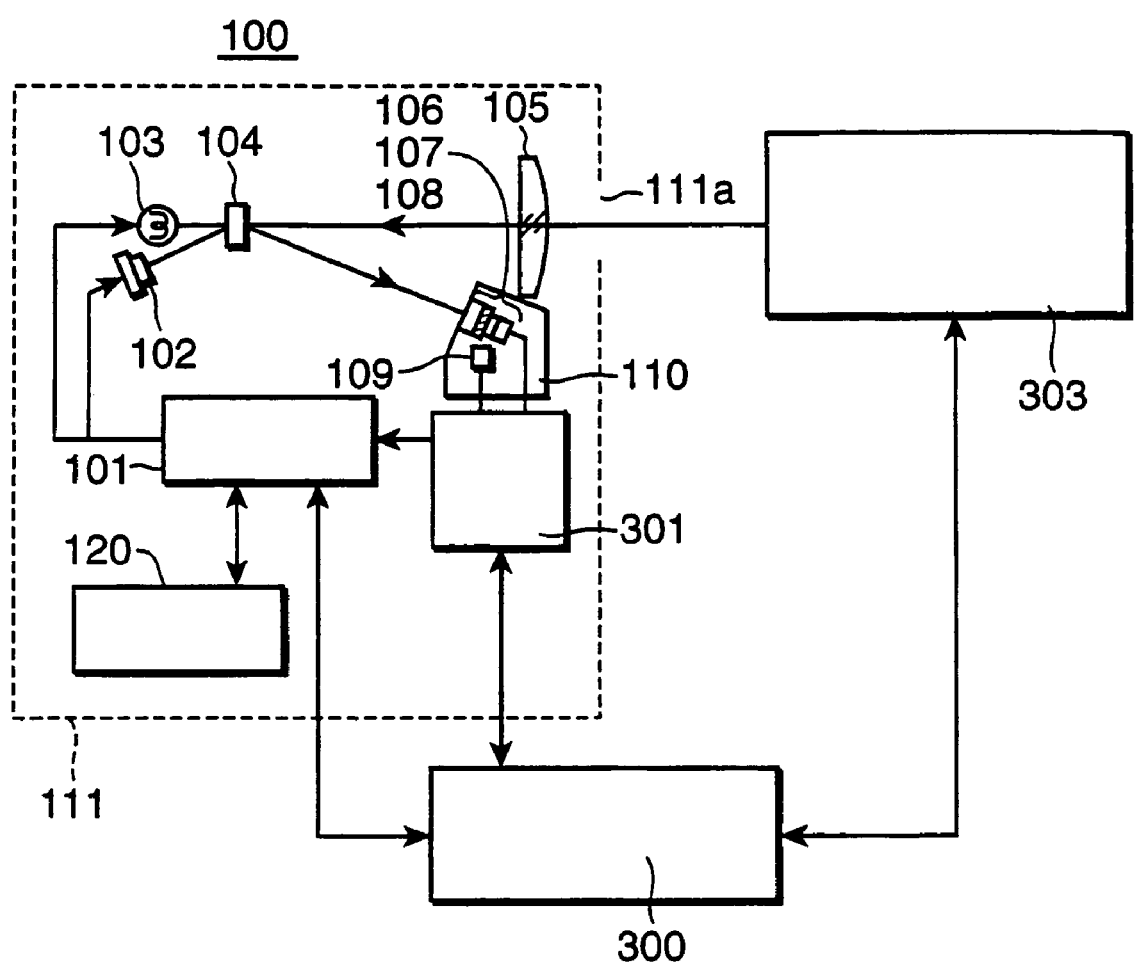
FIG. 5 is a diagram showing the calibrating system for the spectral luminometer upon setting a first correspondence table of the calibration light source.

First, the procedure of setting the first correspondence table in the calibration light source 100 is described. FIG. 5 is a diagram showing the calibration system for the spectral luminometer in setting the first correspondence table in the calibration light source 100. The calibration system of the spectral luminometer shown in FIG. 5 is provided with the calibration light source 100, a reference monochrometer 303 and the system control unit 300.

The reference monochrometer 303 includes a light splitting unit having the wavelength thereof calibrated by mercury emission lines or the like, and a light source unit, and projects a monochromatic light having a desired wavelength toward the calibration light source 100.

The system control unit 300 causes the reference monochrometer 303 to emit a plurality of monochromatic lights having wavelengths near the output wavelength of the emission-line light source 102 at an interval of a specified wavelength to make the monochromatic lights incident on the opening 111a formed in the housing 111 of the calibration light source 100. In this embodiment, the system control unit 300 causes the reference monochrometer 303 to emit monochromatic lights having wavelengths of 644 nm to 656 nm near the output wavelength of 650 nm of the emission-line light source 102 at an interval of 2 nm. The monochromatic lights incident on the calibration light source 100 are incident on the diffusing plate 104 after passing through the collimating optical system 105. The lights diffused and reflected by the diffusing plate 104 are detected by the first and second monitor sensors 106, 107. The system control unit 300 obtains the outputs $I_1$, $I_2$ of the first and second monitor sensors 106, 107 corresponding to the respective monochromatic lights which are inputted from the controller 101 of the calibration light source 100, and calculates the ratios $I_1/I_2$ of the outputs $I_1$, $I_2$. The system control unit 300 generates the first correspondence table by relating the calculated ratios $I_1/I_2$ to the wavelengths $\lambda_m$ of the monochromatic lights.

The aluminum block 110 in which the first to third monitor sensors 106, 107, 108 and the temperature sensor 109 are placed can be exposed by detaching a lid 111b (see FIG. 3) at the bottom of the housing 111 of the calibration light source 100. A constant-temperature unit 301 controlled by the control system unit 300 is closely attached to this exposed aluminum block 110, thereby controlling the temperatures of the first to third monitor sensors 106, 107, 108. The temperatures of the first to third monitor sensors 106, 107, 108 are detected by the temperature sensor 109. The system control unit 300 sets a plurality of temperatures T1, T2, T3 in the aluminum block 110 by controlling the constant-temperature unit 301 and obtains the outputs $I_1$, $I_2$ at the respective temperatures. In this embodiment, the system control unit 300 sets the temperature in the aluminum block 110 approximately at T1=13° C., T2=23° C., T3=33° C. and obtains the outputs $I_1$, $I_2$. Simultaneously, the temperature sensor 109 detects the temperatures T1, T2, T3 of the first and second monitor sensors 106, 107 and outputs the detected temperatures T1, T2, T3 to the controller 101. The system control unit 300 obtains the detected temperatures T1, T2, T3 from the controller 101, generates the first correspondence table by relating the outputs $I_1$, $I_2$ to the wavelengths $\lambda_m$ of the monochromatic lights for each temperature, and stores the generated first correspondence table in the storage 120 of the calibration light source 100. TABLE-1 below shows an example of the first correspondence table generated as above.

TABLE 1

| Wavelength of Monochromatic Light | $\lambda_m$ | 644 nm | 646 nm | 648 nm | 650 nm | 652 nm | 654 nm | 656 nm |
|---|---|---|---|---|---|---|---|---|
| $I_{10}/I_{20}$ | $T_1$ | $(I_{10}/I_{20})_{11}$ | $(I_{10}/I_{20})_{12}$ | $(I_{10}/I_{20})_{13}$ | $(I_{10}/I_{20})_{14}$ | $(I_{10}/I_{20})_{15}$ | $(I_{10}/I_{20})_{16}$ | $(I_{10}/I_{20})_{17}$ |
| | $T_2$ | $(I_{10}/I_{20})_{21}$ | $(I_{10}/I_{20})_{22}$ | $(I_{10}/I_{20})_{23}$ | $(I_{10}/I_{20})_{24}$ | $(I_{10}/I_{20})_{25}$ | $(I_{10}/I_{20})_{26}$ | $(I_{10}/I_{20})_{27}$ |
| | $T_3$ | $(I_{10}/I_{20})_{31}$ | $(I_{10}/I_{20})_{32}$ | $(I_{10}/I_{20})_{33}$ | $(I_{10}/I_{20})_{34}$ | $(I_{10}/I_{20})_{35}$ | $(I_{10}/I_{20})_{36}$ | $(I_{10}/I_{20})_{37}$ |

As shown in TABLE-1, the ratio $I_{10}/I_{20}$ of the output $I_{10}$ to the output $I_{20}$ is as follows, for example, when the wavelength $\lambda_m$ of the monochromatic light is 644 nm. The ratio $I_{10}/I_{20}$ is $(I_{10}/I_{20})_{11}$ in the case that the temperature detected by the temperature sensor 109 is T1; the ratio $I_{10}/I_{20}$ is $(I_{10}/I_{20})_{21}$ in the case that the temperature is T2; and the ratio $I_{10}/I_{20}$ is $(I_{10}/I_{20})_{31}$ in the case that the temperature is T3. In this way, the system control unit 300 generates the first correspondence table by relating the wavelengths $\lambda_m$ of the monochromatic lights to the outputs $I_1$, $I_2$ for each temperature, and stores the generated first correspondence table in the controller 101.

At the time of the calibration, the controller 101 applies interpolation to the ratio $I_1/I_2$ of the output $I_1$ to the output $I_2$ for the temperature T detected by the temperature sensor 109 with reference to the first correspondence table shown in TABLE-1, newly generates a correspondence table of $\Lambda_{LD}$ and $I_1/I_2$ at the detected temperature T, and applies interpolation to $\Lambda_{LD}$ for $I_1/I_2$ with reference to the newly generated correspondence table to calculate the estimated value $\Lambda_{LD}$ of the output wavelength corresponding to the monitored ratio $I_1/I_2$.

Figure 6:
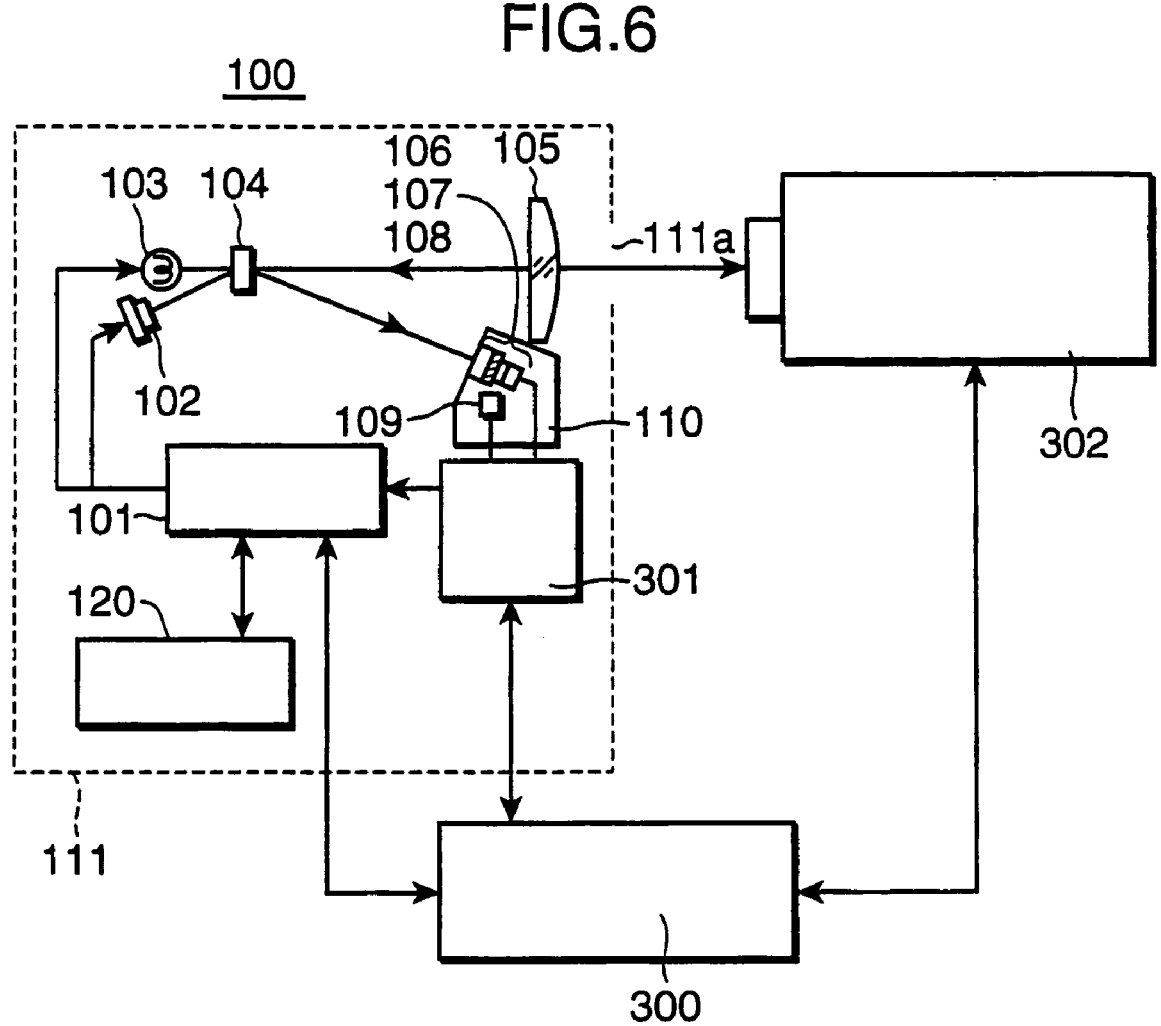
FIG. 6 is a diagram showing the calibrating system for the spectral luminometer upon setting a second correspondence table of the calibration light source.

Next, the procedure of setting the second correspondence table in the calibration light source 100 is described. FIG. 6 is a diagram showing the calibration system for the spectral luminometer in setting the second correspondence table in the calibration light source 100. The calibration system of the spectral luminometer shown in FIG. 6 is provided with the calibration light source 100, a reference spectral luminometer 302 and the system control unit 300.

The reference spectral luminometer 302 has its output wavelength calibrated by a reference monochrometer and its spectral sensitivity calibrated by a standard light bulb.

The system control unit 300 turns the incandescent light source 103 of the calibration light source 100 at three kinds of drive voltages $V_1$, $V_2$, $V_3$, causes the first to third monitor sensors 106, 107, 108 to detect the radiation beams from the diffusing plate 104, and causes the reference spectral luminometer 302 to measure relative spectral intensity distributions $R_1(\lambda)$, $R_2(\lambda)$, $R_3(\lambda)$ of the beams emerging from the collimating optical system 105. The system control unit 300 obtains the outputs $I_{10}$, $I_{20}$, $I_{30}$ of the first to third monitor sensors 106, 107, 108 from the controller 101 of the calibration light source 100, calculates the ratios $I_{30}/I_{10}$ of the outputs 130 to the outputs $I_{10}$ and the ratios $I_{20}/I_{10}$ of the outputs $I_{20}$ to the outputs $I_{10}$. The system control unit 300 generates the second correspondence table by relating the calculated ratios $I_{30}/I_{10}$, the outputs $I_{20}$ and the calculated ratios $I_{20}/I_{10}$ to the relative spectral intensity distributions $R_1(\lambda)$, $R_2(\lambda)$, $R_3(\lambda)$.

The aluminum block 110 in which the first to third monitor sensors 106, 107, 108 and the temperature sensor 109 are placed can be exposed by detaching the lid 111b (see FIG. 3) at the bottom of the housing 111 of the calibration light source 100. The constant-temperature unit 301 controlled by the control system unit 300 is closely attached to this exposed aluminum block 110, thereby controlling the temperatures of the first to third monitor sensors 106, 107, 108. The temperatures of the first to third monitor sensors 106, 107, 108 are detected by the temperature sensor 109. The system control unit 300 sets a plurality of temperatures T1, T2, T3 in the aluminum block 110 by controlling the constant-temperature unit 301 and obtains the outputs $I_{10}$, $I_{20}$, $I_{30}$ at the respective temperatures. In this embodiment, the system control unit 300 sets the temperature in the aluminum block 110 approximately at T1=13° C., T2=23° C., T3=33° C. and obtains the outputs $I_{10}$, $I_{20}$, $I_{30}$. Simultaneously, the temperature sensor 109 detects the temperatures T1, T2, T3 of the first to third monitor sensors 106 to 108 and outputs the detected temperatures T1, T2, T3 to the controller 101. The system control unit 300 obtains the detected temperatures T1, T2, T3 from the controller 101, generates the second correspondence table by relating the ratios $I_{30}/I_{10}$ to the relative spectral intensity distributions $R(\lambda)$ for each temperature, and stores the generated second correspondence table in the storage 120 of the calibration light source 100. TABLE-2 below shows an example of the second correspondence table generated as above.

At the time of the calibration, the controller 101 applies interpolation to the ratios $I_3/I_1$ of the outputs $I_3$ to the outputs 11, the outputs 12, and the ratios $I_2/I_1$ of the outputs $I_2$ to the outputs $I_1$ for the temperatures, newly generates a correspondence table of the relative spectral intensity distributions $R(\lambda)$, the ratios $I_3/I_1$, the outputs 12 and the ratios $I_2/I_1$ at the monitored temperature T, and applies interpolation to the relative spectral intensity distributions $R(\lambda)$ for the ratios $I_3/I_1$ with reference to the newly generated correspondence table to calculate the relative spectral intensity distributions $R(\lambda)$, the outputs $I_2$ and the ratios $I_2/I_1$ corresponding to the monitored ratio $I_3/I_1$.

Figure 7:
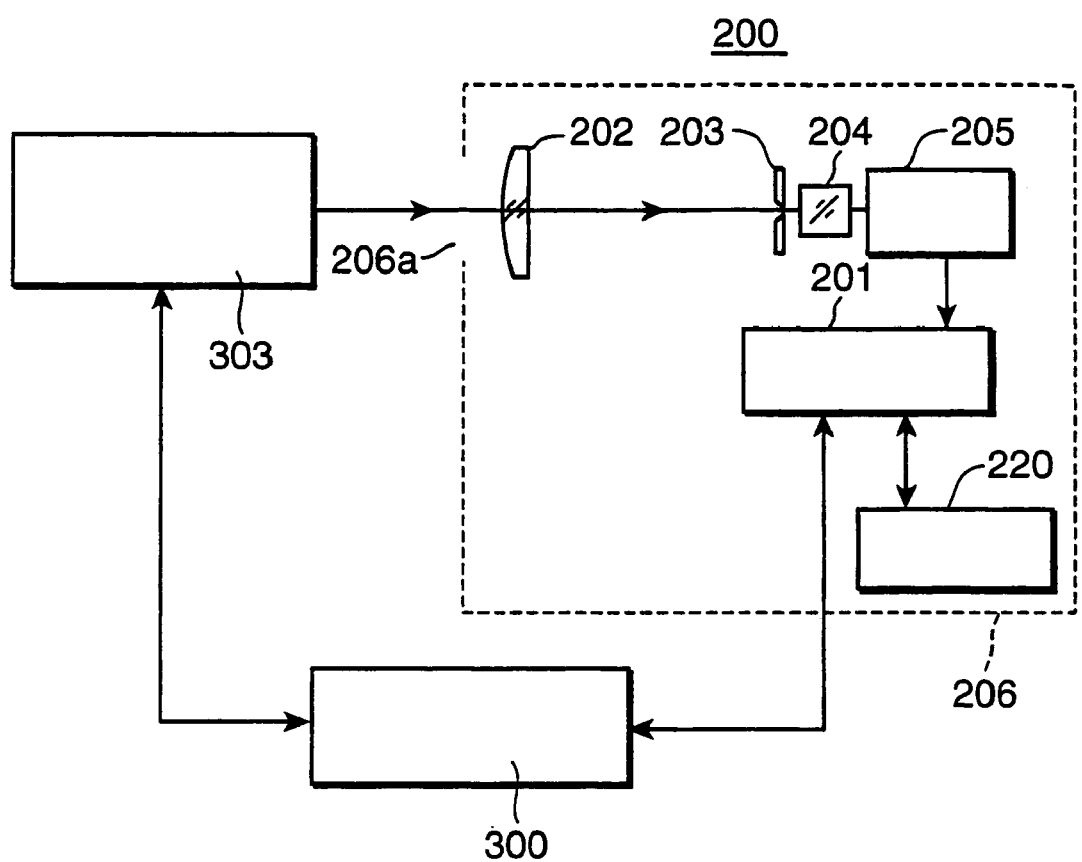
FIG. 7 is a diagram showing the calibrating system for the spectral luminometer upon setting a third correspondence table of the calibration light source.

Next, the procedure of setting the third correspondence table in the calibration light source 100 is described. FIG. 7 is a diagram showing the calibration system for the spectral luminometer in setting the third correspondence table in the calibration light source 100. The calibration system of the spectral luminometer shown in FIG. 7 is provided with the spectral luminometer 200, the reference monochrometer 303 and the system control unit 300.

The system control unit 300 causes the reference monochrometer 303 to emit a plurality of monochromatic lights having wavelengths near the output wavelength of the emission-line light source 102 at an interval of a specified wavelength to make the monochromatic lights incident on the opening 206a formed in the housing 206 of the spectral luminometer 200. In this embodiment, the system control unit 300 causes the reference monochrometer 303 to emit monochromatic lights having wavelengths of 644 nm to 656 nm near the output wavelength of 650 nm of the emission-line light source 102 at an interval of 2 nm. The monochromatic lights incident on the spectral luminometer 200 are incident on the diaphragm 203 after passing through the converging optical system 202. The monochromatic lights having passed through the diaphragm 203 are collected by the condenser lens 204 and incident on the light receiving

TABLE 2

| Temperature | Drive Voltage<br>Rel. Spectral<br>Intensity Distribution | $V_1$<br>$R_1(\lambda)$ | $V_2$<br>$R_2(\lambda)$ | $V_3$<br>$R_3(\lambda)$ |
|---|---|---|---|---|
| $T_1$ | $I_{30}/I_{10}, I_{20}, I_{20}/I_{10}$ | $(I_{30}/I_{10})_{11}, (I_{20})_{11},$<br>$(I_{20}/I_{10})_{11}$ | $(I_{30}/I_{10})_{12}, (I_{20})_{12},$<br>$(I_{20}/I_{10})_{12}$ | $(I_{30}/I_{10})_{13}, (I_{20})_{13},$<br>$(I_{20}/I_{10})_{13}$ |
| $T_2$ | | $(I_{30}/I_{10})_{21}, (I_{20})_{21},$<br>$(I_{20}/I_{10})_{21}$ | $(I_{30}/I_{10})_{22}, (I_{20})_{22},$<br>$(I_{20}/I_{10})_{22}$ | $(I_{30}/I_{10})_{23}, (I_{20})_{23},$<br>$(I_{20}/I_{10})_{23}$ |
| $T_3$ | | $(I_{30}/I_{10})_{31}, (I_{20})_{31},$<br>$(I_{20}/I_{10})_{31}$ | $(I_{30}/I_{10})_{32}, (I_{20})_{32},$<br>$(I_{20}/I_{10})_{32}$ | $(I_{30}/I_{10})_{33}, (I_{20})_{33},$<br>$(I_{20}/I_{10})_{33}$ |

As shown in TABLE-2, the ratios $I_{30}/I_{10}$, the outputs $I_{20}$ and the ratios $I_{20}/I_{10}$ are as follows, for example, in the case that the spectral intensity distribution is $R_1(\lambda)$ and the incandescent light source 103 is driven at the drive voltage $V_1$. The ratio $I_{30}/I_{10}$ is $(I_{30}/I_{10})_{11}$, the outputs $I_{20}$ is $(I_{20})_{11}$ and the ratio $I_{20}/I_{10}$ is $(I_{20}/I_{10})_{11}$ when the temperature detected by the temperature sensor 109 is T1; the ratio $I_{30}/I_{10}$ is $(I_{30}/I_{10})_{21}$, the outputs $I_{20}$ is $(I_{20})_{21}$ and the ratio $I_{20}/I_{10}$ is $(I_{20}/I_{10})_{21}$ when the temperature is T2; and the ratio $I_{30}/I_{10}$ is $(I_{30}/I_{10})_{31}$, the outputs $I_{20}$ is $(I_{20})_{31}$ and the ratio $I_{20}/I_{10}$ is $(I_{20}/I_{10})_{31}$ when the temperature is T3. In this way, the system control unit 300 generates the second correspondence table by relating the relative spectral intensity distributions $R(\lambda)$ to the ratios $I_{30}/I_{10}$, the outputs $I_{20}$ and the ratios $I_{20}/I_{10}$ for each temperature and stores the generated second correspondence table in the storage 120 of the calibration light source 100.

unit 205, and are dispersed according to the wavelength and received by the respective light receiving sensors $S_n$ of the light receiving unit 205.

The system control unit 300 obtains the outputs $Q_n$ from the respective light receiving sensors $S_n$ and calculates the outputs $Q_1$ (n=48 to 52) of the light receiving sensors near the output wavelength of the emission-line light source 102 corresponding to the respective monochromatic lights and three ratios $Q_{48}/Q_{50}$, $Q_{49}/Q_{51}$, $Q_{50}/Q_{52}$ corresponding to the respective emission-line wavelengths. The system control unit 300 generates the third correspondence table by relating the calculated ratios $Q_{48}/Q_{50}$, $Q_{49}/Q_{51}$, $Q_{50}/Q_{52}$ to the wavelengths $\lambda_m$ of the monochromatic lights, and stores the generated third correspondence table in the storage 220 of the spectral luminometer 200. TABLE-3 below shows an example of the third correspondence table generated as above.

TABLE 3

| Emission-Line Wavelength | $\lambda_m$ | 644 nm | 646 nm | 648 nm | 650 nm | 652 nm | 654 nm | 656 nm |
|---|---|---|---|---|---|---|---|---|
| Output Ratio | $Q_{48}/Q_{50}$ | $(Q_{48}/Q_{50})_1$ | $(Q_{48}/Q_{50})_2$ | $(Q_{48}/Q_{50})_3$ | $(Q_{48}/Q_{50})_4$ | $(Q_{48}/Q_{50})_5$ | $(Q_{48}/Q_{50})_6$ | $(Q_{48}/Q_{50})_7$ |
| | $Q_{49}/Q_{51}$ | $(Q_{49}/Q_{51})_1$ | $(Q_{49}/Q_{51})_2$ | $(Q_{49}/Q_{51})_3$ | $(Q_{49}/Q_{51})_4$ | $(Q_{49}/Q_{51})_5$ | $(Q_{49}/Q_{51})_6$ | $(Q_{49}/Q_{51})_7$ |
| | $Q_{50}/Q_{52}$ | $(Q_{50}/Q_{52})_1$ | $(Q_{50}/Q_{52})_2$ | $(Q_{50}/Q_{52})_3$ | $(Q_{50}/Q_{52})_4$ | $(Q_{50}/Q_{52})_5$ | $(Q_{50}/Q_{52})_6$ | $(Q_{50}/Q_{52})_7$ |

As shown in TABLE-3, the ratio $Q_{48}/Q_{50}$ of the output $Q_{48}$ to the output $Q_{50}$ is $(Q_{48}/Q_{50})_1$, the ratio $Q_{49}/Q_{51}$ of the output $Q_{49}$ to the output $Q_{51}$ is $(Q_{49}/Q_{51})_1$, the ratio $Q_{50}/Q_{52}$ of the output $Q_{50}$ to the output $Q_{52}$ is $(Q_{50}/Q_{52})_1$, for example, in the case that the wavelength $\lambda_m$ of the monochromatic lights is 644 nm. In this way, the system control unit 300 generates the third correspondence table by relating the wavelengths $\lambda_m$ of the monochromatic lights to the three ratios $Q_{48}/Q_{50}$, $Q_{49}/Q_{51}$, $Q_{50}/Q_{52}$ corresponding to the respective emission-line wavelengths and stores the generated third correspondence table in the storage 220 of the spectral luminometer 200.

At the time of the calibration, the controller 201 selects the ratio $Q_n/Q_{n+2}$ closest to "1" among the three output ratios $Q_n/Q_{n+2}$, applies interpolation to $\lambda_m$ of the third correspondence table shown in TABLE-3 for $Q_n/Q_{n+2}$ to calculate the wavelength $\lambda_m$ corresponding to the measured ratio $Q_n/Q_{n+2}$ in the case that the emission-line wavelength $\Lambda_{LD}$ of the calibration light source 100 was measured.

The calibration system for the spectral luminometer for recalibrating the wavelength and the spectral sensitivity of the spectral luminometer at the user side has been described thus far. There is a possibility that the stray-light level and the half-width of the light receiving unit 205 of the spectral luminometer change with time. Accordingly, a calibration system for the spectral luminometer which system can confirm the stray-light level and the half-width of the spectral luminometer is described below.

Figure 8:
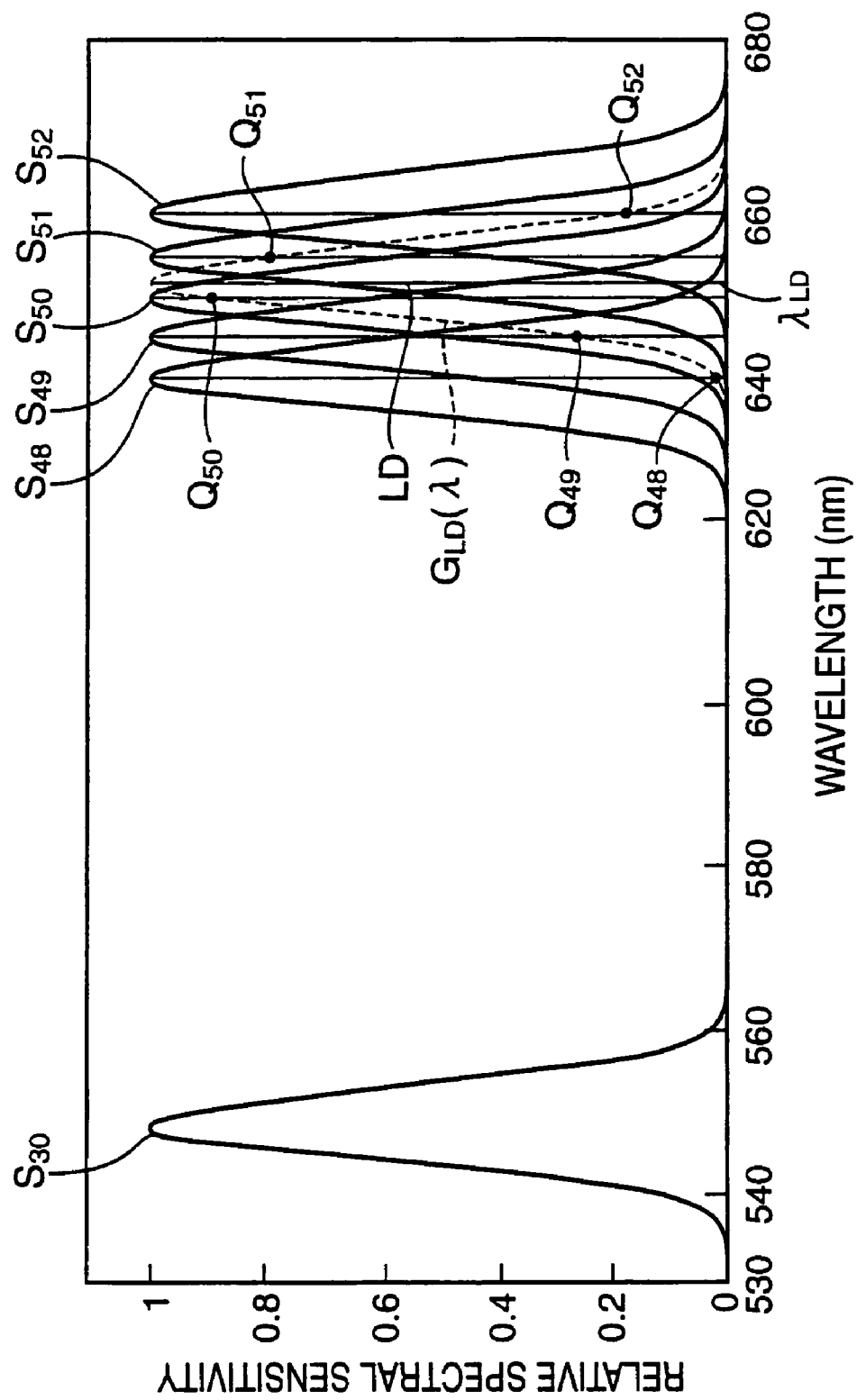
FIG. 8 is a graph showing how to estimate a half-width of the spectral luminometer to be calibrated.

FIG. 8 is a graph showing the estimation of the half-width of the spectral luminometer to be calibrated. In FIG. 8, vertical axis represents relative spectral sensitivity and horizontal axis represents wavelength. As shown in FIG. 8, if the spectral sensitivities of a plurality of light receiving sensors $S_n$ (n=48 to 52) near the emission-line wavelength $\lambda_{LD}$ can be approximated by mathematical functions such as a Gaussian function and are substantially analogous to each other, a mathematical function $G_{LD}$ fitting coordinates $(\lambda_{cn}, Q_n)$ given by a center wavelength $\lambda_{cn}$ Of light receiving sensors $S_n$ and the outputs $Q_n$ approximates the spectral sensitivities of the light receiving sensors $S_n$ and gives an approximate value of the half-width. Here, the mathematical function is assumed to be a Gaussian function.

The Gaussian function is defined by following equation (2) and optical values of three constants, i.e. center wavelength $\lambda_{cn}$, half-width $\Delta\lambda$ and amplitude A may be obtained by the least squares method in order to determine the shape of this function.

$$G(\lambda)=A\cdot\exp\left[-\{(\lambda-\lambda c)/(\Delta\lambda/C)\}^2\right] \quad (2)$$

The system control unit 300 can detect a change in the half-width by comparing the half-width $\Delta\lambda$ of $G(\lambda)$ estimated by the least squares method with a half-width $\Delta\lambda_0$ of $G_0(\lambda)$ estimated at the time of the calibration at a factory and stored beforehand.

When the emission-line output of the calibration light source 100 is measured by the spectral luminometer 200, an output $Q_{30}$ of the light receiving sensor (e.g. light receiving sensor $S_{30}$) having a spectral sensitivity of 0 at the emission-line wavelength $\lambda_{LD}$ and sufficiently distanced from the emission-line wavelength $\lambda_{LD}$ serves as a index of the stray-light level. In order to cancel a change in the output of the emission-line light source 102, a relative comparison with an emission-light intensity $Q(\lambda_{LD})$ is necessary, but the emission-line intensity $Q(\lambda_{LD})$ cannot be directly obtained in the case of the emission-line light source 102 whose output wavelength is distributed between 645 nm and 655 nm. However, the amplitude A of the Gaussian function $G(\lambda)$ obtained to estimate the aforementioned half-width is a value approximate to the emission-line intensity $Q(\lambda_{LD})$. Accordingly, the system control unit 300 can detect a change in the stray-light level by calculating a ratio $Q_{30}/A$ of the output $Q_{30}$ of the light receiving sensor $S_{30}$ to the amplitude A and comparing it with a ratio $(Q_{30}/A)_0$ obtained at the time of the calibration at the factory and stored beforehand.

Although the changes in the stray-light level and the half-width cannot be corrected at the user side, they can be confirmed at the time of the wavelength calibration and the user can be urged, for example, to return the spectral luminometer to the factory by being notified if the changes in the stray-light level and the half-width are beyond permissible ranges.

Figure 9:
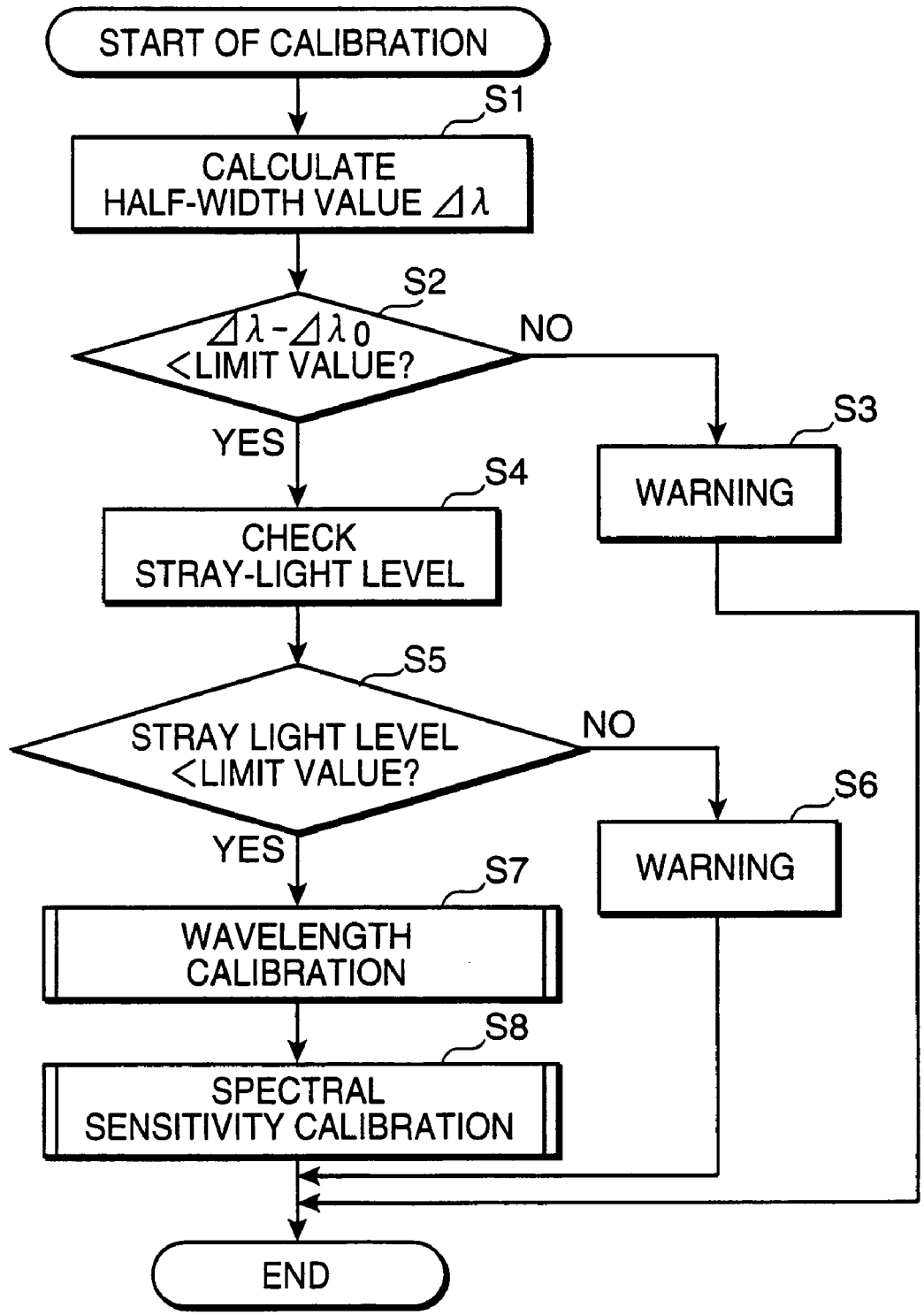
FIG. 9 is a flowchart showing an operation of the calibrating system for the spectral luminometer.

Next, the operation of the calibration system for the spectral luminometer is described. FIG. 9 is a flowchart showing the operation of the calibration system for the spectral luminometer.

In Step S1, the system control unit 300 calculates the half-width $\Delta\lambda$ of the light receiving unit 205 of the spectral luminometer 200.

In Step S2, the system control unit 300 compares a change amount $(\Delta\lambda-\Delta\lambda_0)$ in the half-width obtained by subtracting the initial half-width $\Delta\lambda_0$ calculated at the time of the calibration at the factory from the calculated half-width $\Delta\lambda$ with a specified limit value set beforehand. It should be noted that the change in the half-width leads to changes in the output rations of the sensors neighboring the emission-line wavelength, thereby causing an error in the estimated value of the emission-line wavelength. Accordingly, the specified limit value is given as such a maximum change in the half-width that the error of the estimated value of the emission-line wavelength satisfies a required specification. Here, Step S4 follows if the change amount $(\Delta\lambda-\Delta\lambda_0)$ is smaller than the limit value (YES in Step S2), whereas Step S3 follows if it is larger than or equal to the limit value (NO in Step S2).

In Step S3, the system control unit 300 completes the calibration for the spectral luminometer after warning the user that the half-width $\Delta\lambda$ is abnormal. Specifically, the calibration system for the spectral luminometer is further provided with a half-width warning notifier (e.g. formed by an LED, LCD or the like) for notifying the user that the half-width is abnormal, and the user can confirm by means of this half-width warning notifier that the half-width is abnormal. The half-width warning notifier includes a half-width warning display portion for displaying that the half-width is abnormal.

In Step S4, the system control unit 300 checks the stray-light level of the light receiving unit 205 of the spectral luminometer 200. Specifically, the system control unit 300 calculates the ratio $Q_{30}/A$ of the output $Q_{30}$ of the light receiving sensor $S_{30}$ having a sensitivity of 0 at the emission-line wavelength $\lambda_{LD}$ and adapted to detect the light having a wavelength sufficiently distanced from the emission-line wavelength $\lambda_{LD}$ to the amplitude A obtained by the Gaussian function $G(\lambda)$.

In Step S5, the system control unit 300 compares a change amount of the stray-light level $\{(Q_{30}/A)-(Q_{30}/A)_0\}$ obtained by subtracting the initial ratio $(Q_{30}/A)_0$ calculated at the time of the calibration at the factory from the calculated ratio $Q_{30}/A$ with the specified limit value set beforehand. It should be noted that the specified limit value is given as a value corresponding to the stray-light level (such a level that is 1% or below at 450 nm when a 500 nm cutoff filter is inserted in comparison with the level before the filter is inserted) specified, for example, by JIS28724. Step S7 follows if the change amount $\{(Q_{30}/A)-(Q_{30}/A)_0\}$ is smaller than the limit value (YES in Step S5), whereas Step S6 follows if it is larger than or equal to the limit value.

In Step S6, the system control unit 300 the system control unit 300 completes the calibration for the spectral luminometer after warning the user that the stray-light level is abnormal. Specifically, the calibration system for the spectral luminometer is further provided with a stray-light warning notifier (e.g. formed by an LED, LCD or the like) for notifying the user that the stray-light level is abnormal, and the user can confirm by means of this stray-light warning notifier that the stray-light level is abnormal. The stray-light warning notifier includes a stray-light warning display portion for displaying that the stray-light level is abnormal.

In Step S7, the system control unit 300 performs the wavelength calibration. This wavelength calibration is described later with reference to FIG. 10.

In Step S8, the system control unit 300 performs the spectral sensitivity calibration for calibrating the spectral sensitivity. This spectral sensitivity calibration is described later with reference to FIG. 11.

In this way, in the calibration system for the spectral luminometer, the half-width and the stray-light level are checked and the wavelength calibration and the spectral sensitivity calibration are performed unless there is any problem in the half-width and the stray-light level.

Figure 10:
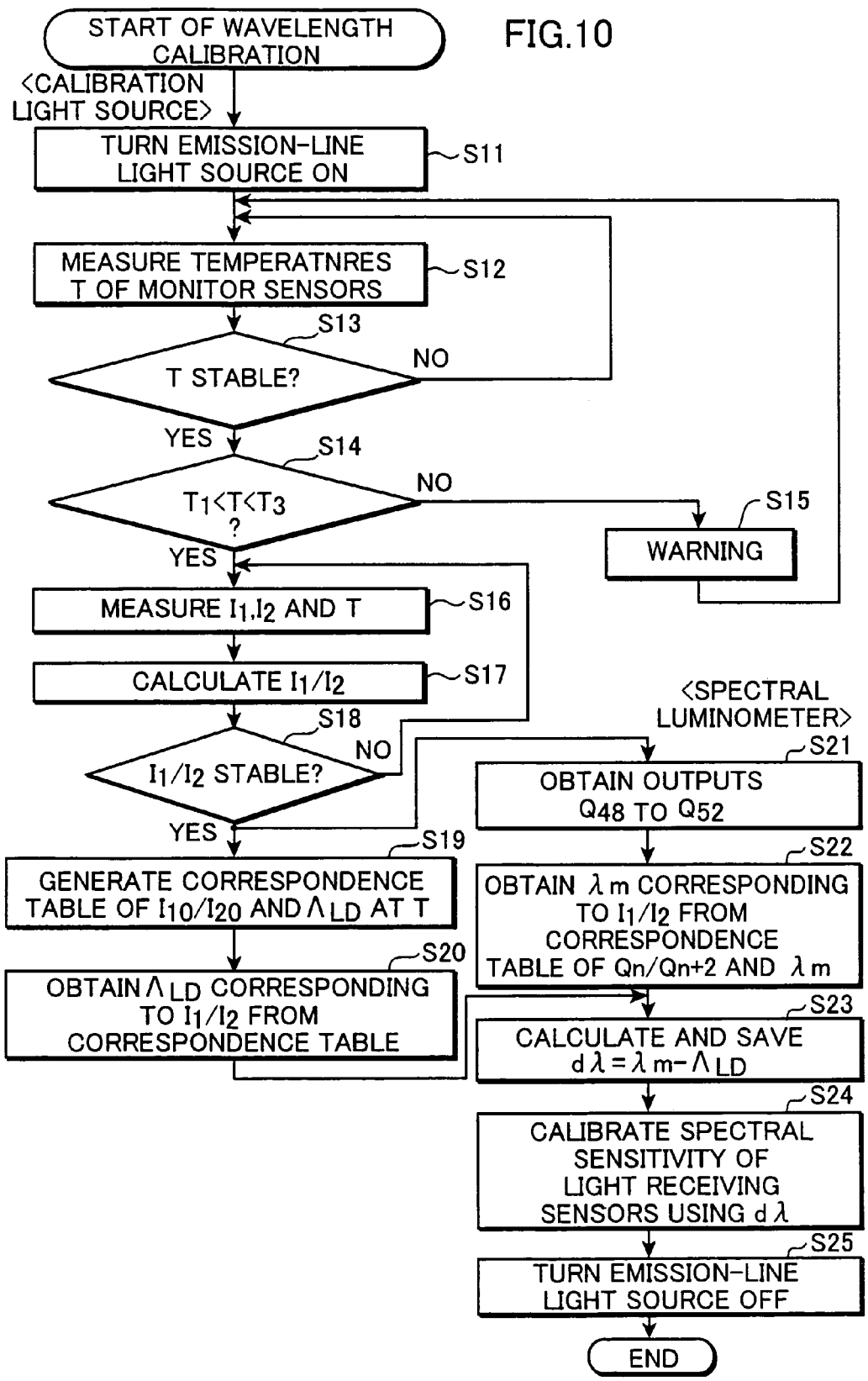
FIG. 10 is a flowchart showing a subroutine "Output Wavelength Calculation" executed in Step S7 of FIG. 9.

FIG. 10 is a flowchart showing the wavelength calibration performed in Step S7 of FIG. 9.

In Step S11, the controller 101 executes such a control as to turn the emission-line light source 102 on, which in turn outputs emission lines of the emission-line wavelength.

In Step S12, the controller 101 controls the temperature sensor 109 to measure the temperatures T of the first to third monitor sensors 106 to 108, and the temperature sensor 109 measures the temperatures T of the first to third monitor sensors 106 to 108. The temperatures T measured by the temperature sensor 109 are outputted to the controller 101.

In Step S13, the controller 101 judges whether or not the temperatures T of the first to third monitor sensors 106 to 108 measured by the temperature sensor 109 are stable. The controller 101 judges that the temperatures T are stable if temperature changes from the temperatures T measured last time are equal to or below a reference value. Step S14 follows if the temperatures T of the first to third monitor sensors 106 to 108 are judged to be stable (YES in Step S13), whereas this subroutine returns to Step S12 if the temperatures T of the first to third monitor sensors 106 to 108 are judged not to be stable (NO in Step S13). The measurement is repeated until the temperatures T of the first to third sensor monitors 106 to 108 measured by the temperature sensor 109 become stable.

In Step S14, the controller 101 judges whether or not the temperatures T lie within an interpolatable range of $T_1<T<T_3$. Step S15 follows if the temperatures T are judged to lie beyond the interpolatable range (NO in Step S14), whereas Step S16 follows if they are judged to lie within the interpolatable range (YES in Step S14).

In Step S15, the controller 101 gives a warning that the temperatures T of the first to third monitor sensors 106 to 108 measured by the temperature sensor 109 lie beyond the interpolatable range and this subroutine returns to Step S12.

In Step S16, the controller 101 controls the first monitor sensor 106, the second monitor sensor 107 and the temperature sensor 109 to measure the output $I_1$ of the first monitor sensor 106, the output $I_2$ of the second monitor sensor 107 and the output temperatures T of the temperature sensor 109.

In Step S17, the controller 101 calculates the ratio $I_1/I_2$ of the output $I_1$ of the first monitor sensor 106 to the output $I_2$ of the second monitor sensor 107.

In Step S18, the controller 101 judges whether or not the calculated ratio $I_1/I_2$ of the output $I_1$ of the first monitor sensor 106 to the output $I_2$ of the second monitor sensor 107 is stable. It should be noted that the controller 101 judges that this ratio $I_1/I_2$ is stable if a change amount of the ratio $I_1/I_2$ from the last measurement is smaller than or equal to a reference value. Here, Steps S19 and S21 follow if the ratio $I_1/I_2$ is judged to be stable (YES in Step S18), whereas this subroutine returns to Step S16 if the ratio $I_1/I_2$ is judged not to be stable (NO in Step S18). The measurement is repeated until the ratio $I_1/I_2$ becomes stable.

In Step S19, the controller 101 applies interpolation to the ratios $I_{10}/I_{20}$ of the output $I_{10}$ of the first monitor sensor 106 to the output $I_{20}$ of the second monitor sensor 107 at the respective temperatures $T_1$, $T_2$, $T_3$ of the first correspondence table (see TABLE-1) stored beforehand in the storage 120 for the temperatures T, thereby newly generating a correspondence table relating the ratios $I_{10}/I_{20}$ to the estimated value $\Lambda_{LD}$ of the emission-line wavelength for the temperature T measured by the temperature sensor 109.

In Step S20, the controller 101 calculates the estimated value $\Lambda_{LD}$ of the emission-line wavelength corresponding to the ratio $I_1/I_2$ of the output $I_1$ of the first monitor sensor 106 to the output $I_2$ of the second monitor sensor 107 by applying interpolation to the newly generated correspondence table for the ratio $I_{10}/I_{20}$. The controller 101 outputs the calculated estimated value $\Lambda_{LD}$ to the system control unit 300.

On the other hand, if the ratio $I_1/I_2$ of the output $I_1$ of the first monitor sensor 106 to the output $I_2$ of the second monitor sensor 107 is judged to be stable, the output light of the emission-line light source 102 of the calibration light source 100 is measured by the spectral luminometer 200.

In Step S21, the controller 201 obtains the outputs $Q_n$ (n=48 to 52) from the respective light receiving sensors $S_n$ (n=48 to 52).

In Step S22, the controller 201 selects the ratio $Q_n/Q_{n+2}$ closest to "1" from the output ratios $Q_n/Q_{n+2}$ of the outputs $Q_n$ of the light receiving sensors $S_n$ to the outputs $Q_{n+2}$ of light receiving sensors $S_{n+2}$, and calculates the emission-line wavelength $\lambda_m$ corresponding to the selected ratio $Q_n/Q_{n+2}$ by applying interpolation to the third correspondence table (see TABLE-3) stored beforehand in the storage 220 for the ratio $Q_n/Q_{n+2}$. The controller 201 outputs the calculated emission-line wavelength $\lambda_m$ to the system control unit 300.

In Step S23, the system control unit 300 subtracts the estimated value $\Lambda_{LD}$ inputted from the controller 101 from the emission-line wavelength $\lambda_m$ inputted from the controller 201 and stores the obtained subtracted value $d\lambda$ ($\lambda_m - \Lambda_{LD}$) as a wavelength change amount in the controller 201 of the spectral luminometer 200.

In Step S24, the system control unit 300 performs the calibration by shifting the spectral sensitivities of the respective light receiving sensors by $d\lambda$.

In Step S25, the controller 101 executes such a control as to turn the emission-line light source 102 off, thereby completing the output wavelength calibration.

In this way, the emission lines having the known emission-line wavelength are outputted from the emission-line light source 102 provided in the calibration light source 100, the emission-line output of the calibration light source 100 is measured by the spectral luminometer 200, and the system control unit 300 estimates the wavelength $\lambda_m$ of the emission-line output from the relative ratios $Q_n/Q_{n+2}$ of the outputs $I_1$ from the light receiving sensors $S_n$ at a plurality of measurement wavelengths neighboring the emission-line wavelength, estimates the wavelength change amount $d\lambda$ from a difference between the estimated wavelength $\lambda_m$ of the emission-line output and the known emission-line wavelength $\Lambda_m$, and performs a calibration using this wavelength change amount a as a wavelength shift amount uniform over the entire measurement wavelength range of the light receiving sensors $S_n$ when the spectral luminometer 200 measured the emission-line output of the calibration light source 100.

Accordingly, the wavelength of the spectral luminometer 200 can be recalibrated at the user side by estimating the wavelength change amount of the spectral sensitivities of the light receiving sensors $S_n$ using the calibration light source 100, and the user can constantly use the spectral luminometer 200 with a high precision by calibrating the wavelength of the spectral luminometer with a sufficient frequency. Further, the calibration light source 100 is unlikely to change with time since having a simpler construction and a lower using frequency as compared to the spectral luminometer 200, and can be maintained to be precise by being returned to the factory or the service point about once a year for the recalibration.

The third correspondence table of the output ratios of the light receiving sensors $S_n$ at a plurality of measurement wavelengths neighboring the emission-line wavelength and the wavelengths of the emission-line output is stored in the spectral luminometer 200 beforehand. The system control unit 300 estimates the wavelength of the emission-line output from the relative ratios of the respective outputs measured by the spectral luminometer 200 and the third correspondence table, estimates the wavelength change amount from the difference between the estimated wavelength of the emission-line output and the known emission-line wavelength, and performs the calibration using this wavelength change amount as a wavelength shift amount uniform over the entire measurement wavelength range of the light receiving sensors $S_n$. Therefore, the wavelength of the emission-line output can be estimated by a simple algorithm from the ratios of the outputs from the light receiving sensors $S_n$ at a plurality of measurement wavelengths neighboring the emission-line wavelength.

Further, the output wavelength of the visible laser diode (LD) 102 is estimated from the ratio of the outputs of the first and second monitor sensors 106, 107 having different spectral sensitivities near the output wavelength of the visible LD 102, and the estimated output wavelength of the visible LD 102 is outputted to the spectral luminometer 200. Thus, the spectral luminometer 200 can be highly precisely recalibrated using the visible LD having a low price, a sufficient emission-line output, a good impact resistance and a long lifetime as an emission-line light source.

Further, the first correspondence table of the ratio of the outputs of the first and second monitor sensors 106, 107 and the output wavelength of the visible LD 102 is stored beforehand in the calibration light source 100, and the output wavelength of the visible LD 102 is estimated from the ratio of the outputs of the first and second monitor sensors 106, 107 and the first correspondence table. Therefore, the output wavelength of the visible LD 102 can be estimated by a simple algorithm from the ratio of the outputs of the first and second monitor sensors 106, 107.

Figure 11:
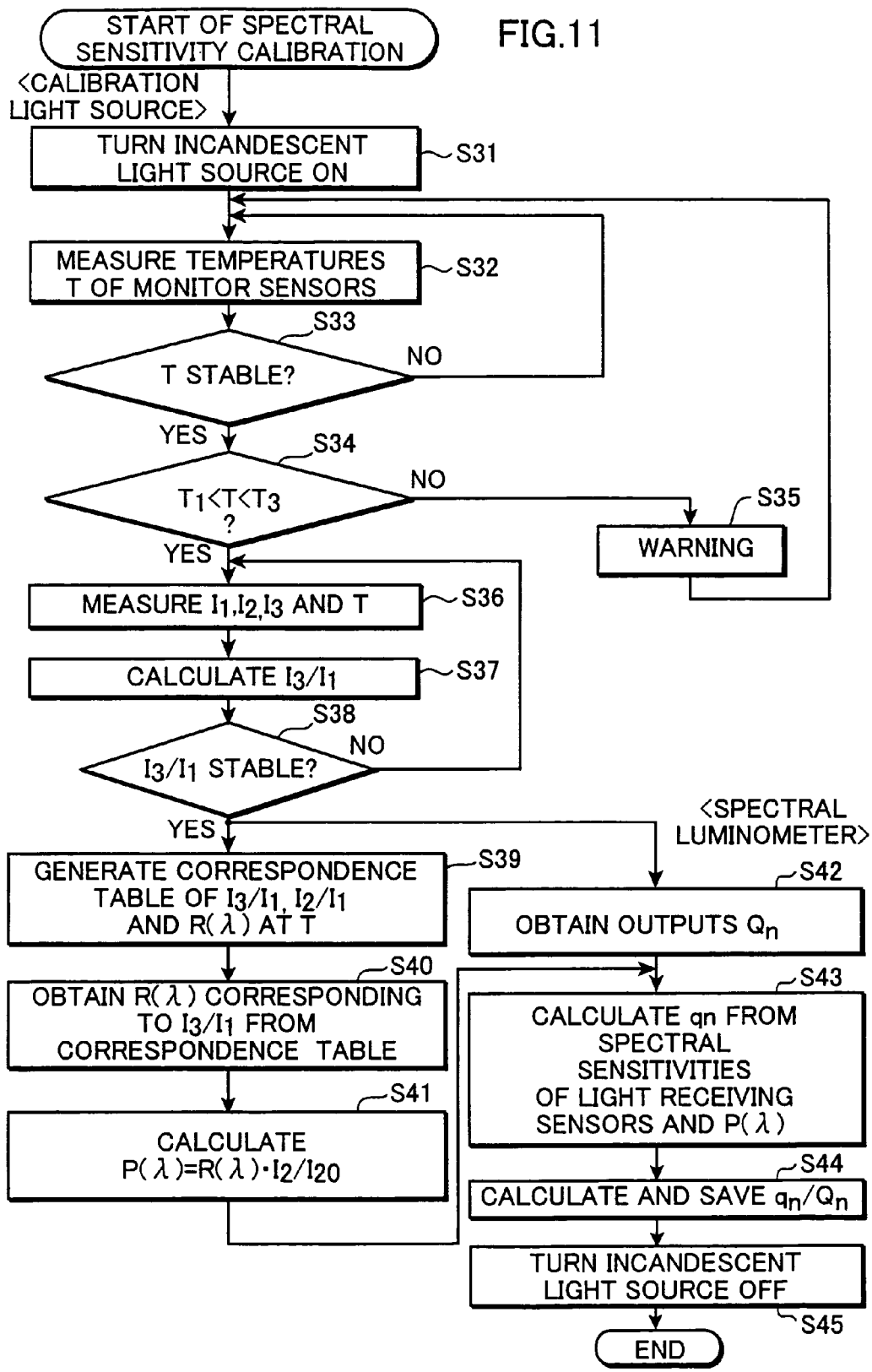
FIG. 11 is a flowchart showing a subroutine "Spectral Sensitivity Calculation" executed in Step S8 of FIG. 9.

FIG. 11 is a flowchart showing the spectral sensitivity calibration performed in Step S8 of FIG. 9.

In Step S31, the controller 101 executes such a control as to turn on the incandescent light source 103, which in turn outputs a white light having a plurality of wavelengths.

In Step S32, the controller 101 controls the temperature sensors 109 to measure the temperatures T of the first to third sensor monitors 106 to 108, and the temperature sensors 109 measures the temperatures T of the first to third sensor monitors 106 to 108. The temperatures T measured by the temperature sensor 109 are outputted to the controller 101.

In Step S33, the controller 101 judges whether or not the temperatures T of the first to third monitor sensors 106 to 108 measured by the temperature sensor 109 are stable. The controller 101 judges that the temperatures T are stable if temperature changes from the temperatures T measured last time are equal to or below a reference value. Step S34 follows if the temperatures T of the first to third monitor sensors 106 to 108 are judged to be stable (YES in Step S33), whereas this subroutine returns to Step S32 if the temperatures T of the first to third monitor sensors 106 to 108 are judged not to be stable (NO in Step S33). The measurement is repeated until the temperatures T of the first to third sensor monitors 106 to 108 measured by the temperature sensor 109 become stable.

In Step S34, the controller 101 judges whether or not the temperatures T lie within the interpolatable range of $T_1 < T < T_3$. Step S35 follows if the temperatures T are judged to lie beyond the interpolatable range (NO in Step S34), whereas Step S36 follows if they are judged to lie within the interpolatable range (YES in Step S34).

In Step S35, the controller 101 gives a warning that the temperatures T of the first to third monitor sensors 106 to 108 measured by the temperature sensor 109 lie beyond the interpolatable range and this subroutine returns to Step S32.

In Step S36, the controller 101 controls the first to third monitor sensors 106 to 108 and the temperature sensor 109 to measure the output $I_1$ of the first monitor sensor 106, the output $I_2$ of the second monitor sensor 107, the output $I_3$ of the third monitor sensor 108 and the output temperatures T of the temperature sensor 109.

In Step S37, the controller 101 calculates the ratio $I_3/I_1$ of the output $I_3$ of the third monitor sensor 108 to the output $I_1$ of the first monitor sensor 106.

In Step S38, the controller 101 judges whether or not the calculated ratio $I_3/I_1$ of the output $I_3$ of the third monitor sensor 108 to the output $I_1$ of the first monitor sensor 106 is stable. It should be noted that the controller 101 judges that this ratio $I_3/I_1$ is stable if a change amount of the ratio $I_3/I_1$ from the last measurement is smaller than or equal to a reference value. Here, Steps S39 and S42 follow if the ratio $I_3/I_1$ is judged to be stable (YES in Step S38), whereas this subroutine returns to Step S36 if the ratio $I_3/I_1$ is judged not to be stable (NO in Step S38). The measurement is repeated until the ratio $I_3/I_1$ becomes stable. The reference values used to judge the stability of the temperatures T and the ratio $I_3/I_1$ are set in view of estimation errors of the spectral intensity distribution given by the temperatures T and the ratio $I_3/I_1$ and a required precision in calibrating the spectral sensitivity.

In Step S39, the controller 101 applies interpolation to the ratios $I_{30}/I_{10}$ of the outputs $I_{30}$ of the third monitor sensor 108 to the outputs $I_{10}$ of the first monitor sensor 106, the outputs $I_{20}$ of the second monitor sensor 107 and the ratios $I_{20}/I_{10}$ of the outputs $I_{20}$ of the second monitor sensor 107 to the outputs $I_{10}$ of the first monitor sensor 106 at the respective temperatures $T_1$, $T_2$, $T_3$ of the second correspondence table (see TABLE-2) stored beforehand in the storage 120 for the temperature T, thereby newly generating a correspondence table relating the ratios $I_{30}/I_{10}$ the output $I_{20}$, the ratios $I_{20}/I_{10}$ and the relative spectral intensity distribution $R(\lambda)$ corresponding to the temperature T measured by the temperature sensor 109.

In Step S40, the controller 101 calculates the relative spectral intensity distribution $R(\lambda)$ corresponding to the ratio $I_3/I_1$ of the output $I_3$ of the third monitor sensor 108 to the output $I_1$ of the first monitor sensor 106 by applying interpolation to the newly generated correspondence table for the ratio $I_3/I_1$.

In Step S41, the controller 101 estimates the spectral intensity distribution $P(\lambda)$ based on the calculated relative spectral intensity distribution $R(\lambda)$, the output $I_2$ of the second monitor sensor 107 and the output $I_{20}$ corresponding relative spectral intensity distribution $R(\lambda)$ in the second correspondence table, and outputs it to the system control unit 300.

On the other hand, if the ratio $I_3/I_1$ of the output $I_3$ of the third monitor sensor 108 to the output $I_1$ of the first monitor sensor 106 is judged to be stable, the output light of the incandescent light source 103 of the calibration light source 101 is measured by the spectral luminometer 200.

In Step S42, the controller 201 controls the respective light receiving sensors $S_n$ (n=0 to 60) and obtains the outputs $I_1$ (n=0 to 60) of the respective light receiving sensors $S_n$. The controller 201 outputs the obtained outputs $Q_n$ of the respective light receiving sensors $S_n$ to the system control unit 300.

In Step S43, the system control unit 300 calculates the outputs $q_n$ based on the spectral intensity distribution $P(\lambda)$ inputted from the controller 101 of the calibration light source 100 and the spectral sensitivities of the wavelength-recalibrated light receiving sensors $S_n$, (n=0 to 60) inputted from the controller 201 of the spectral luminometer 200.

In Step S44, the system control unit 300 calculates the ratios $q_n/Q_n$ of the calculated ratios $q_n$ to the actually measured values $Q_n$ for the respective light receiving sensors $S_n$ and stores the calculated ratios $q_n/Q_n$ as sensitivity correction coefficients in the controller 201 of the spectral luminometer 200.

In Step S45, the controller 101 executes such a control as to turn the incandescent light source 103 off, thereby completing the spectral sensitivity calibration.

In this way, the spectral intensity distribution of the incandescent light source 103 is estimated from the outputs of the first to third monitor sensors 106 to 108 having different spectral sensitivities by the controller 101 of the calibration light source 100, and the output light of the calibration light source 100 is measured by the spectral luminometer 200. The system control unit 300 performs the sensitivity calibration by calculating the outputs $q_n$ estimated to be obtained from the respective light receiving sensors $S_n$ based on the spectral intensity distribution $P(\lambda)$ estimated by the spectral intensity distribution estimator 101b and the spectral sensitivities of the respective wavelength-recalibrated light receiving sensors $S_n$ obtained from the spectral luminometer 200 when the spectral luminometer 200 measured the output light of the calibration light source 100, calculating the ratios $q_n/Q_n$ of the obtained estimated outputs $q_n$ to the outputs $Q_n$ actually obtained from the light receiving sensors $S_n$ for the respective light receiving sensors $S_n$, and storing the calculated ratios $q_n/Q_n$ in the spectral luminometer 200.

Accordingly, the sensitivity of the spectral luminometer 200 can be recalibrated at the user side by storing the ratios $q_n/Q_n$ of the estimated outputs $q_n$ of the respective light receiving sensors $S_n$ calculated based on the spectral intensity distribution $P(\lambda)$ and the spectral sensitivities of the light receiving sensors $S_n$ to the outputs $Q_n$ of the light receiving sensors $S_n$ when the spectral luminometer 200 measured the output light of the calibration light source 100 as the sensitivity correction coefficients used to calibrate the sensitivity of the spectral luminometer 200. The user can constantly use the spectral luminometer 200 with a high precision by calibrating the sensitivity of the spectral luminometer 200 with a sufficient frequency.

Although the system control unit 300 is provided outside the calibration light source 100 and the spectral luminometer 200 in this embodiment, the present invention is not particularly limited thereto. Either one of the controller 101 of the calibration light source 100 and the controller 201 of the spectral luminometer 200 may function as the system control unit 300. In such a case, the calibration system is allowed to have a simpler construction since the calibration light source 100 and the spectral luminometer 200 can be directly connected without necessitating a personal computer having the functions of the system control unit 300.

Further, the aluminum block 110 in which the first to third monitor sensors 106 to 108 are disposed may be kept at a constant temperature using a Peltier device or a like device having a cooling effect. In such a case, the temperature compensation for the first to third monitor sensors 106 to 108 is not necessary since the temperature inside the aluminum block 110 is kept constant by the Peltier device. Thus, a construction for the temperature compensation for the first to third monitor sensors 106 to 108 can be omitted, whereby times required to set the correspondence tables in the calibration light source 100 can be shortened.

Further, the inventive calibration system for the spectral luminometer may be applied to such a spectral luminometer in which the respective light receiving sensors $S_n$ of the light receiving unit 205 have spectral sensitivities spread at a wavelength interval of about 20 nm and having a wide half-width of about 30 nm, and the controller approximates isochromatic functions $x(\lambda)$, $y(\lambda)$, $z(\lambda)$ of a standard observer by following equations (3) to (5) using the spectral sensitivities $s_n(\lambda)$ of the respective light receiving sensors $S_n$ and weight coefficients $C_{xn}$, $C_{yn}$, $C_{zn}$ calculated and stored beforehand. In such a case, the controller calculates and stores a plurality of weight coefficients corresponding to supposable wavelength change amounts beforehand, and calculates tristimulus values x, y, z of an incident light by selecting suitable weight coefficients from a plurality of weight coefficients based on the wavelength change amount estimated by the aforementioned calibration system.

$$x(\lambda)=\Sigma C_{xn}\cdot s_n(\lambda) \quad (3)$$

$$y(\lambda)=\Sigma C_{yn}\cdot s_n(\lambda) \quad (4)$$

$$z(\lambda)=\Sigma C_{zn}\cdot s_n(\lambda) \quad (5)$$

For example, the light receiving unit 205 includes sixteen light receiving sensors arranged at an interval of 20 nm in a wavelength range of 400 to 700 nm and the controller 201 stores twenty one sets of coefficients $(C_{xn})_k$, $(C_{yn})_k$, $(C_{zn})_k$ (k=0 to 20) corresponding to twenty one wavelength change amounts spread at an interval of 0.1 nm from −1 nm to +1 nm. The controller 201 selects the coefficients $(C_{xn})_k$, $(C_{yn})_k$, $(C_{zn})_k$ corresponding to an error (k=M) closest to the wavelength change amount obtained by the wavelength calibration from the stored wavelength change amounts. The controller 201 calculates the tristimulus values x, y, z by following equations (6) to (8) using measured outputs $Q_n$ (n=0 to 15) of the respective light receiving sensors $S_n$ (n=0 to 15).

$$x=\Sigma(C_{xn})_M\cdot Q_n(\lambda) \quad (6)$$

$$y=\Sigma(C_{yn})_M\cdot Q_n(\lambda) \quad (7)$$

$$z=\Sigma(C_{zn})_M\cdot Q_n(\lambda) \quad (8)$$

In this way, errors of the tristimulus values caused by the wavelength change amount can be minimized in the spectral luminometer having a large wavelength interval between the light receiving sensors.

Although the spectral luminometer 200 estimates the wavelength of the emission-line output of the calibration light source 100 from the output ratios of a plurality of light receiving sensors at the measurement wavelengths neighboring the emission-line wavelength in the above description, the wavelength can be estimated using the aforementioned mathematical function used for the estimation of the half-width. If the mathematical function is a Gaussian function as above, a Gaussian function (expressed by the above equation (2)) most fitting the outputs $Q_n$ (n=48 to 52) of a plurality of light receiving sensors $S_n$ near the emission-line wavelength is obtained, and a center wavelength λc thereof is set as the wavelength $\lambda_m$ of the emission-line output. In such a case, at a factory, an emission-line output of a light source for reference calibration having the same construction as the calibration light source 100 is measured by means of the spectral luminometer 200, and $(\lambda_m)_0$ is obtained from $\lambda_c$ of the Gaussian function most fitting the outputs $Q_n$ (n=48 to 52) of the light receiving sensors, and a difference $(\delta\lambda)_0=(\lambda_m)_0-(\Lambda_m)_0$ between $(\lambda_m)_0$ and a known emission-line wavelength $(\Lambda_m)_0$ is calculated and stored. At the time of the wavelength recalibration, the emission-line output from the reference spectral luminometer 302 is measured and $\lambda_m$ is obtained in the same process as the one at the factory, a difference $\delta\lambda=\lambda_m-\Lambda_m$ between $\lambda_m$ and the known emission-line wavelength $\Lambda_m$ is calculated, and a wavelength change amount $d\lambda=\delta\lambda-(\delta\lambda)_0$ is calculated and stored. According to this method, it is not necessary to generate correspondence tables by causing the reference spectral luminometer 302 to emit a plurality of monochromatic lights.

Next, a second embodiment of the present invention is described. Although the visible LD is used as an emission-line light source and the output light of the emission-line light source are monitored by the monitor sensors in the first embodiment, a three-wavelength type fluorescent lamp combined with a band pass filter is used as an emission-line light source to omit the monitor sensors for monitoring the output light of the emission-line light source in the second embodiment.

Figure 12:
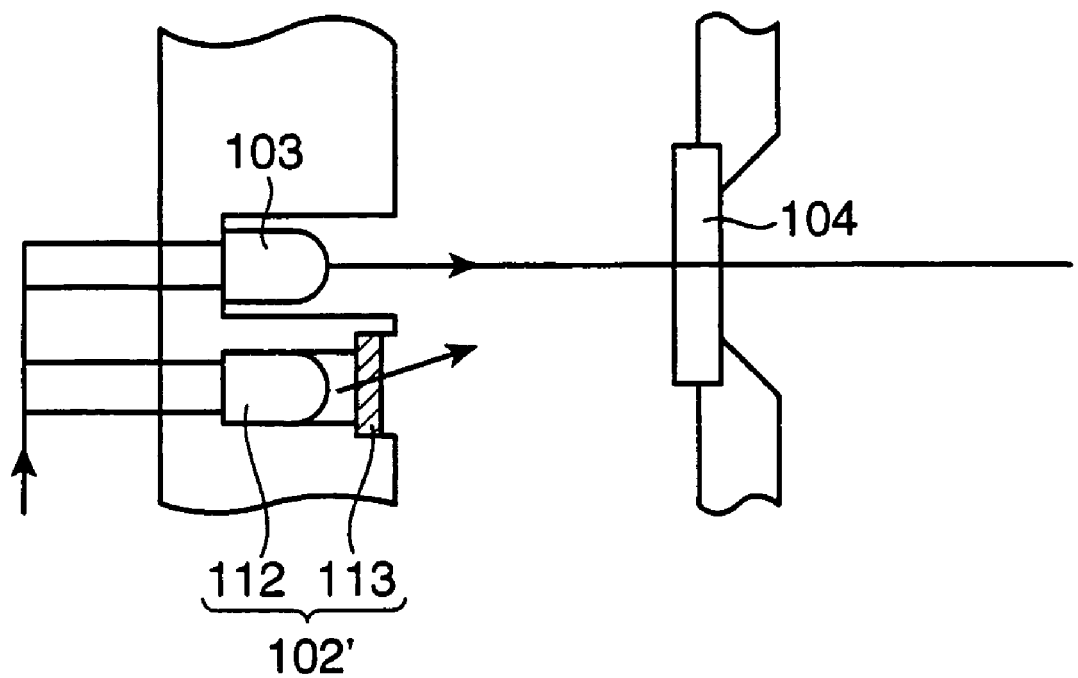
FIG. 12 is a diagram showing a construction of a calibration system according to another embodiment, showing a portion thereof near an emission-line light source and an incandescent light source.

FIG. 12 is a diagram showing a construction of a calibration light source of the second embodiment near an emission-line light source and an incandescent light source. As shown in FIG. 12, a calibration light source 100 of this embodiment is provided with an emission-line light source 102', an incandescent light source 103 and a diffusing plate 104. The emission-line light source 102' includes a three-wavelength type fluorescent lamp 112 and a band pass filter 113.

Figure 13:
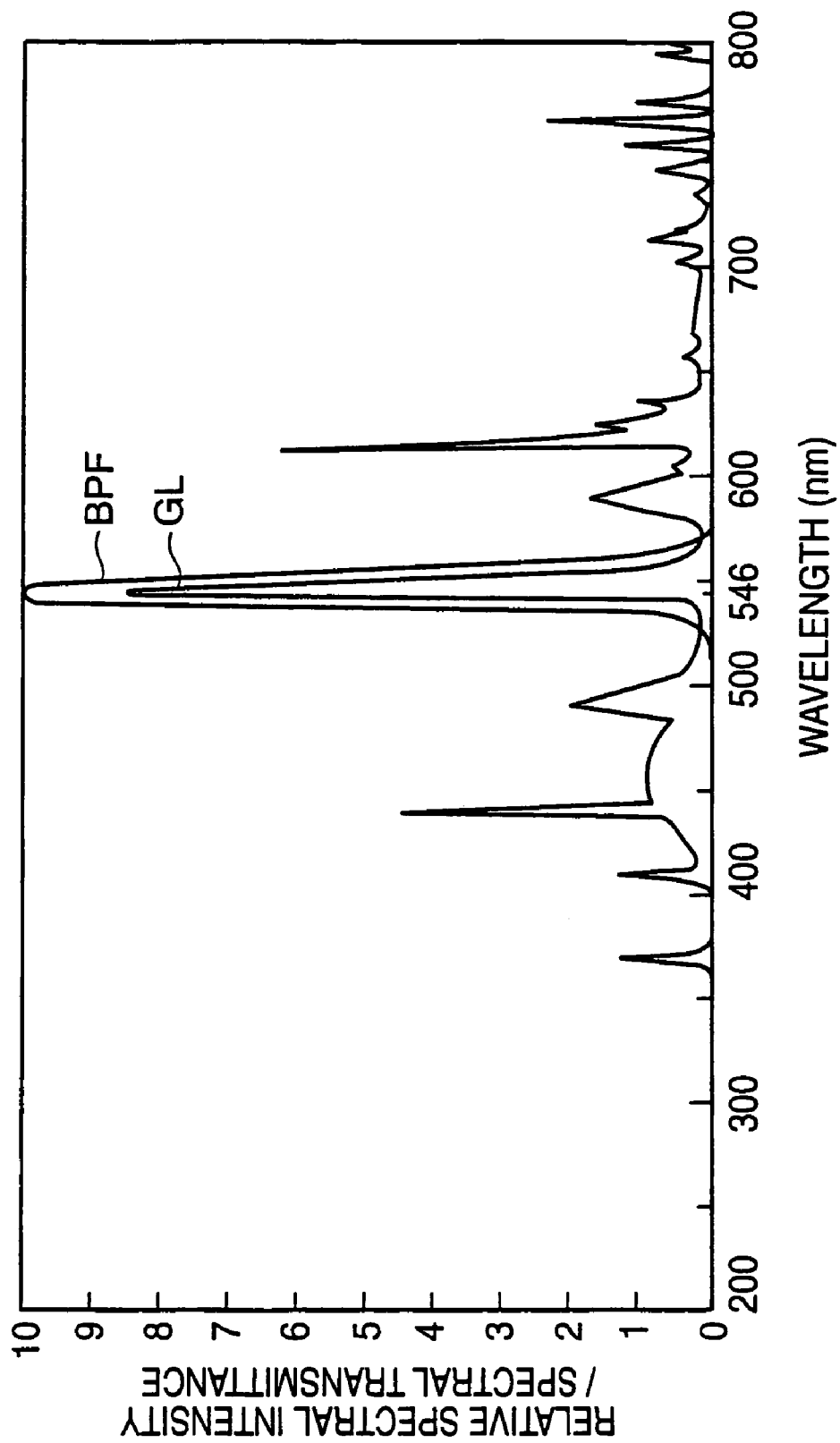
FIG. 13 is a graph showing a spectrum when a three-wavelength type fluorescent lamp is used as an emission-line light source.

FIG. 13 is a graph showing spectra when the three-wavelength type fluorescent lamp is used as an emission-line light source, wherein vertical axis represents relative spectral intensity and transmittance and horizontal axis represents wavelength.

As shown in FIG. 13, the three-wavelength type fluorescent lamp radiates strong emission lines GL near 546 nm. Since there are emission lines or fluorescent radiation in the other wavelength ranges, light emissions in the other wavelength ranges can be suppressed to a negligible level by combining the three-wavelength type fluorescent lamp with a band pass filter BPF having a center wavelength at 546 nm.

Since the wavelength of the emission lines GL results from an energy level of mercury atoms which are a fluorescent material of the fluorescent lamp, it is constantly stable free from an individual difference, a temperature dependence and a change over time. Accordingly, it is not necessary to monitor the emission-line wavelength unlike the first embodiment in which the visible LD is used as an emission-line light source and to consider the respective correspondence tables, relating the emission-line wavelength and the output ratios of the light receiving sensors of the light receiving unit at wavelengths near the emission-line wavelength, stored in the spectral luminometer 200, and the individual differences of the output wavelengths. It is sufficient to store only a correspondence table of about three emission-line wavelengths of 545 nm, 546 nm and 547 nm and output ratios of the light receiving sensors, whereby a time required to set the correspondence table in the spectral luminometer can be shortened.

Further, since only the outputs of the light receiving sensors for receiving the lights having wavelengths neighboring the emission-line wavelengths in response to the emission-line output are used for the wavelength calibration, it is sufficient for the aforementioned band pass filter 113 to suppress the light emission in a wavelength range shown in FIG. 4 where the spectral sensitivities of the neighboring light receiving sensors are not "0" and it is not necessary to combine a side-band filter.

Figure 14:
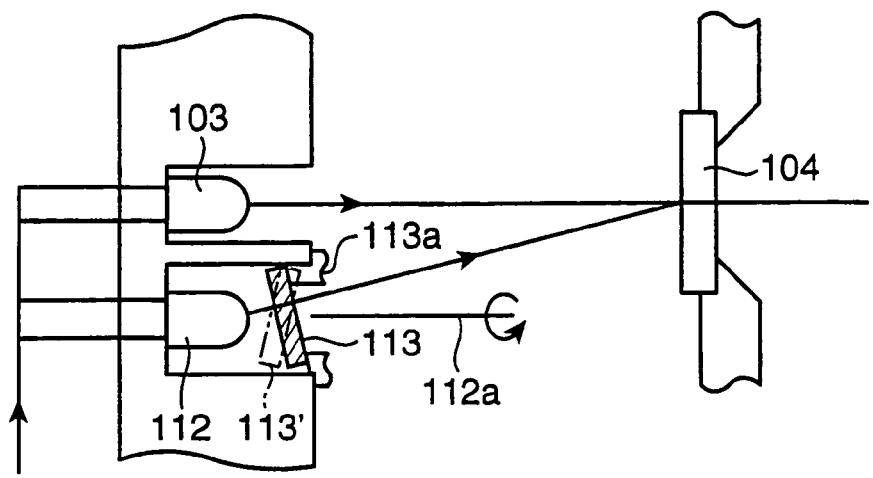
FIG. 14 is a diagram showing how to adjust a transmission wavelength of a band pass filter.

The precision of the center wavelength of the band pass filter 113 permits an error within such a range as to secure a transmittance necessary at the emission-line wavelength. However, in the case of a large error of the center wavelength, the error can be suppressed by such an arrangement that an incident angle of a beam propagating from the fluorescent lamp 112 toward the diffusing plate 104 on the band pass filter 113 is adjustable. FIG. 14 is a diagram showing the construction of the calibration light source near the emission-line light source and the incandescent light source to explain an adjustment of a transmission wavelength of the band pass filter. As shown in FIG. 14, an incident angle of a beam propagating from the fluorescent lamp 112 toward the diffusing plate 104 on the band pass filter 113 is adjusted by mounting a holding tube 113a, in which the band pass filter 113 is obliquely mounted, to face in a suitable direction about an optic axis 112*a* of the fluorescent lamp 112. The center wavelength of the band pass filter 113 by an interference film is shorted to a shorter wavelength side as the incident angle increases. Thus, the error of the center wavelength can be suppressed by making the incident angle of the beam on the band pass filter 113 adjustable. A range defined between two directions 113 and 113' in FIG. 14 is angularly divided into eight sections to define eight directions; the individual center wavelengths of the band pass filter 113 in which a target value of the center wavelength at a perpendicular incidence is set as an upper limit of a supposable error are measured; and a direction in which a necessary shift amount is obtained is selected.

Figure 15:
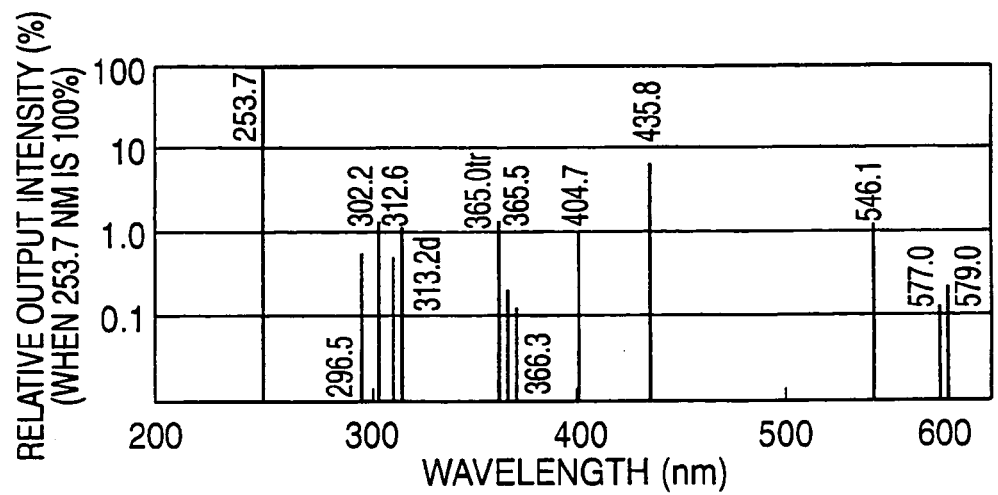
FIG. 15 us a graph showing emission-line spectra of a low-pressure mercury lamp.

Although the emission-line light source 102' is formed by the fluorescent lamp 112 and the band pass filter 113 in this embodiment, the present invention is not particularly limited thereto. The emission-line light source 102' may be formed by a low-pressure mercury lamp. FIG. 15 is a graph showing emission-line spectra of a low-pressure mercury lamp, wherein vertical axis represents relative output intensity in the case that 253.7 nm is 100% and horizontal axis represents wavelength. Since the low-pressure mercury lamp outputs emission lines near 546 nm and its emission lines are independent as shown in FIG. 15, it needs not be combined with a band pass filter unlike the fluorescent lamp. As a result, the construction of the emission-line light source can be simplified.

Figure 16:
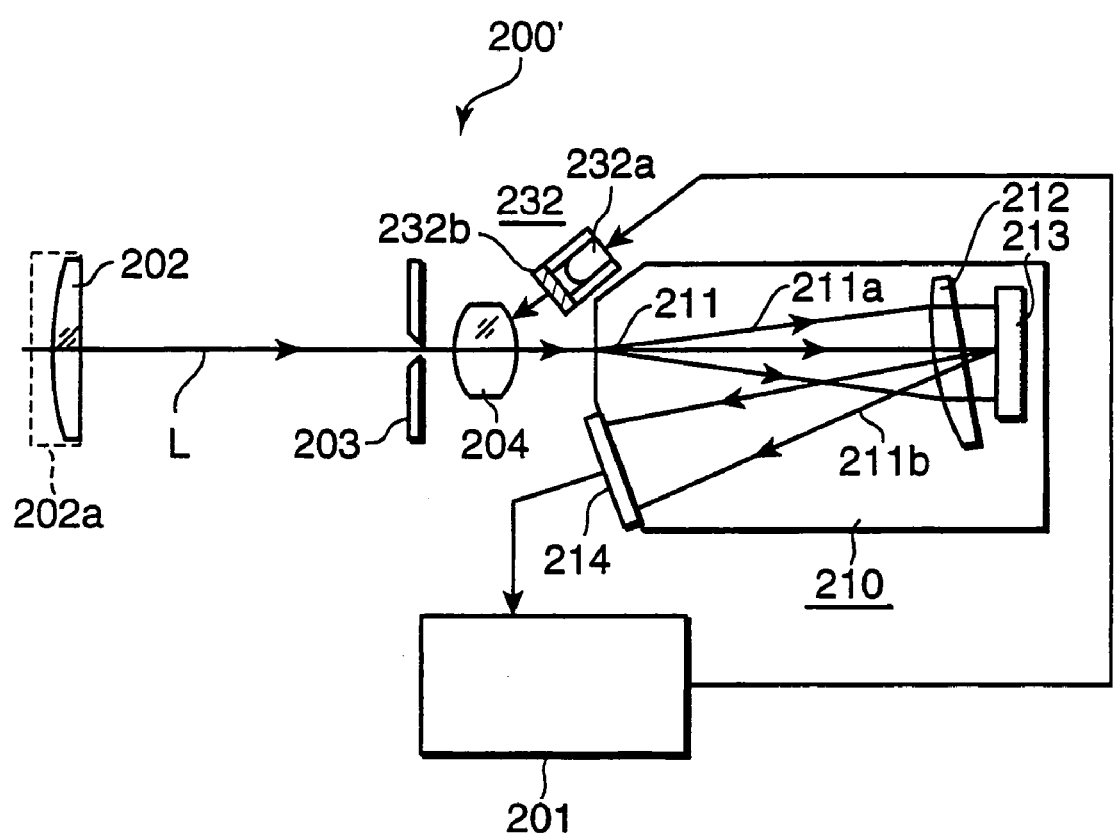
FIG. 16 is a diagram showing the spectral luminometer having the emission-line light source incorporated thereinto in the second embodiment.

The emission-line light source of this embodiment can be built in the spectral luminometer since it needs not monitor the output wavelengths. FIG. 16 is a diagram showing a spectral luminometer incorporated with the emission-line light source according to the second embodiment.

In FIG. 16, a spectral luminometer 200' is provided with a controller 201, a converging optical system 202, a diaphragm 203, a condenser lens 204, a light splitting unit 210, and an emission-line light source 232. The light splitting unit 210 includes an incident slit 211, a imaging optical system 212, a diffraction grating 213 and a light receiving sensor array 214.

A measurement light L is converged by the converging optical system 202 and incident on the diaphragm 203. A beam having passed the diaphragm 203 is collected by the condenser lens 204 and incident on the incident slit 211 of the light splitting unit 210. A beam 211*a* having passed the incident slit 211 is made into a parallel beam by the imaging optical system 212 and incident on the diffraction grating 213. The parallel beam incident on the diffraction grating 213 is dispersed and reflected in different directions depending on the respective wavelengths and the dispersed and reflected beams are incident on the imaging optical system 212 again. The imaging optical system 212 images a wavelength-dispersed image 211*b* of the incident slit 211 on the light receiving sensor array 214. In the light receiving sensor array 214, photoelectric conversion elements are arrayed at even intervals to produce currents corresponding to intensities of the received lights.

On the other hand, the emission-line light source 232 is provided at a position obliquely upward from the incident slit 211 of the light splitting unit 210 toward a side of the converging optical system 202. The emission-line light source 232 includes a three-wavelength type fluorescent lamp 232*a* and a band pass filter 232*b*. The three-wavelength type fluorescent lamp 232*a* has its light-emitting timing and period controlled by the controller 201.

In the case of blocking the beam (measurement light L) other than the beam from the emission-line light source 232, a detachable light-blocking cap 202*a* is mounted at an incident side of the converging optical system 202. The light-blocking cap 203*a* is, for example, used to block the measurement light L while a light for calibration is emitted from the emission-line light source 232. When the fluorescent lamp 232*a* is turned on, the light reflected by the condenser lens 204 is incident as a stray-light on the incident slit 211 of the light splitting unit 210, and the wavelength calibration can be performed for the light splitting unit 210 without providing a calibration light source outside by measuring the incident emission-line beam.

Figure 17:
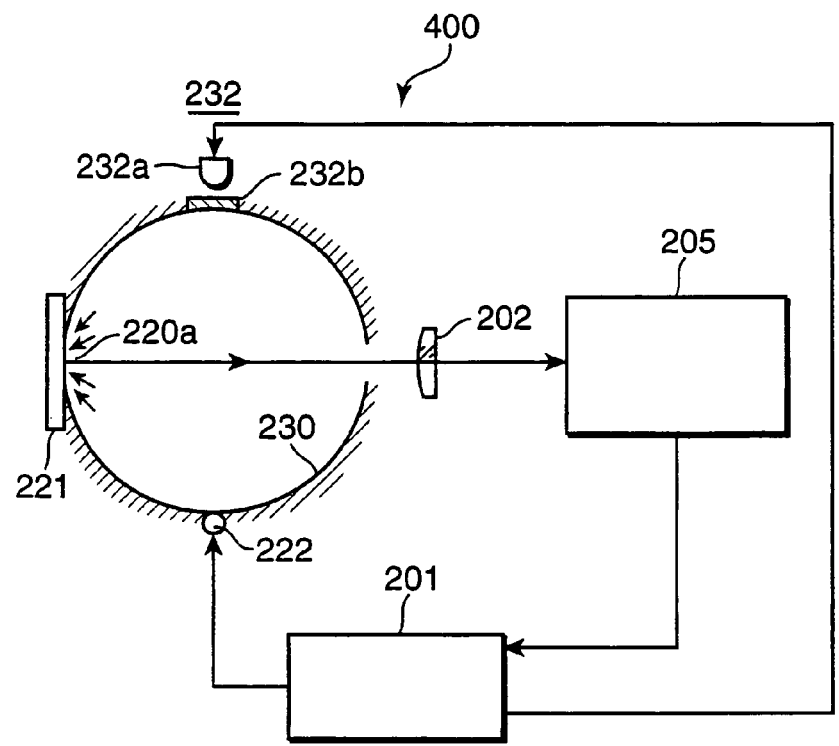
FIG. 17 is a diagram showing the spectrocolorimeter having the emission-line light source incorporated thereinto in the second embodiment.
Figure 18:
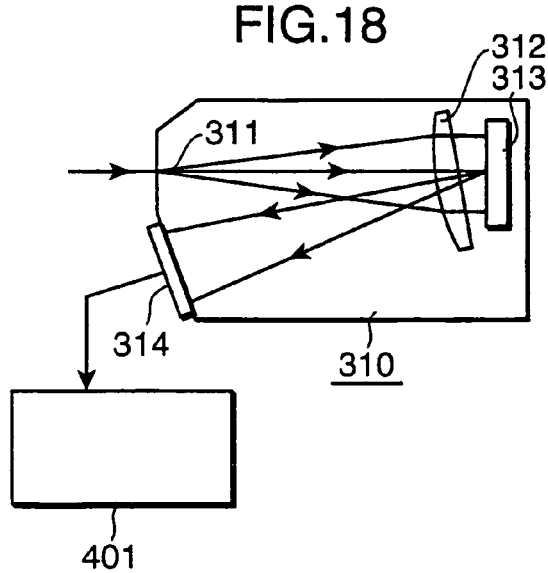
FIG. 18 is a diagram showing a construction of a light splitting unit in a prior art spectral luminometer.
Figure 19:
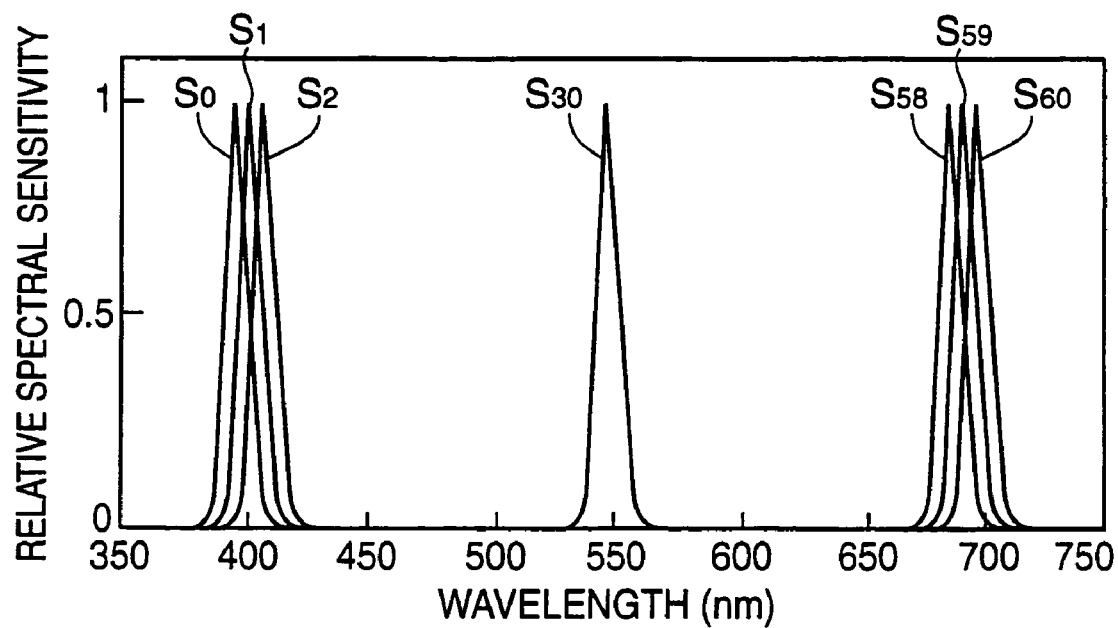
FIG. 19 is a graph showing spectral sensitivities of light receiving sensors of a light receiving sensor array of a polychrometer.

The emission-line light source of this embodiment can also be built in a spectrocolorimeter. FIG. 17 is a diagram showing a spectrocolorimeter incorporated with an emission-line light source.

In FIG. 17, a spectrocolorimeter 400 is provided with a controller 201, a light receiving unit 205, a converging optical system 202 and an integrating sphere 230.

The integrating sphere 230 is a hollow sphere having a magnesium oxide, a barium sulfate or a like white diffusing/reflecting paint having a high diffusing property and a high reflectance applied to the inner wall thereof, and is internally provided with an emission-line light source 232 and a xenon flash lamp (hereinafter, merely "lamp") as a light source for illuminating a sample. A light from the lamp 222 undergoes a multiple reflection at the inner wall of the integrating sphere 230 to produce diffused lights.

After the completion of the white calibration, the controller 201 turns the emission-line light source 232 on to illuminate a white plate 221 and causes the light receiving unit 205 to measure a light reflected by the white plate 221 with the white plate 221 placed at a sample opening 220*a* of the integrating sphere 230. In this way, the wavelength of the light receiving unit 205 can be calibrated without providing the calibration light source outside.

As this invention may be embodied in several forms without departing from the spirit of essential characteristics thereof, the present embodiment is therefore illustrative and not restrictive, since the scope of the invention is defined by the appended claims rather than by the description preceding them, and all changes that fall within metes and bounds of the claims, or equivalence of such metes and bounds are therefore intended to embraced by the claims.

What is claimed is:

1. A calibration system comprising:
   a calibration light source which outputs emission lines having a known emission-line wavelength;
   a spectral luminometer which is to be calibrated, and provided with a light receiver having an array of photoelectric conversion elements for receiving lights produced by dispersing an incident light in accordance with wavelengths and outputting electrical signals corresponding to light intensities of the respective received wavelength components, and adapted to measure an emission-line output of the calibration light source;
   a wavelength estimator which estimates a wavelength of the emission-line output from relative outputs of the light receiver at a plurality of measurement wavelengths neighboring the emission-line wavelength when the spectral luminometer measures the emission-line output of the calibration light source; and
   a wavelength calibrator which calibrates the wavelength of the spectral luminometer by estimating a wavelength change amount from a difference between the estimated wavelength of the emission-line output and the known emission-line wavelength.

2. A calibration system according to claim 1, wherein:

the spectral luminometer further includes a memory which stores in advance a correspondence table of output ratios of the light receiver at the plurality of measurement wavelengths neighboring the emission-line wavelength and the wavelength of the emission-line output; and the wavelength estimator estimates the wavelength of the emission-line output from the output ratios measured by the spectral luminometer and the correspondence table.

3. A calibration system according to claim 1, wherein the calibration light source includes:

a semiconductor laser which emits a laser beam;

a plurality of monitor sensors having different spectral sensitivities near an output wavelength of the semiconductor laser; and an output wavelength estimator which estimates the output wavelength of the semiconductor laser from output ratios of the plurality of monitor sensors.

4. A calibration system according to claim 3, wherein:

the calibration light source further includes a memory which stores in advance a correspondence table of the output ratios of the plurality of monitor sensors and the output wavelength of the semiconductor laser; and the output wavelength estimator estimates the output wavelength of the semiconductor laser from the output ratios of the plurality of monitor sensors and the correspondence table.

5. A calibration system according to claim 4, wherein:

the calibration light source further includes a temperature sensor which detects temperatures of the plurality of monitor sensors;

the memory stores a plurality of correspondence tables corresponding to a plurality of temperatures of the plurality of monitor sensors; and the output wavelength estimator estimates the output wavelength of the semiconductor laser based on the output ratios of the plurality of the monitor sensors and the temperature detected by the temperature sensor.

6. A calibration system according to claim 1, wherein the calibration light source further includes:

an incandescent light source;

a plurality of monitor sensors having different spectral sensitivities; and a spectral intensity distribution estimator which estimates a spectral intensity distribution of the incandescent light source from outputs of the plurality of the monitor sensors.

7. A calibration system according to claim 6, further comprising:

a light receiver output estimator which estimates an output of the light receiver from the spectral intensity distribution estimated by the spectral intensity distribution estimator and the spectral sensitivities of the respective photoelectric conversion elements of the light receiver when the spectral luminometer measures the emission-line output of the calibration light source;

a calculator which calculates a ratio of the estimated output of the light receiver to an actual output of the light receiver for each photoelectric conversion element; and a sensitivity calibrator which calibrates the sensitivity of the spectral luminometer based on the calculated ratio for each photoelectric conversion element.

8. A calibration system according to claim 6, wherein:

the calibration light source further includes a memory which stores in advance a correspondence table of the output ratios of the plurality of monitor sensors and a relative spectral intensity distribution of the incandescent light source; and the spectral intensity distribution estimator estimates the relative spectral intensity distribution of the incandescent light source from the output ratios of the plurality of monitor sensors and the correspondence table.

9. A calibration system according to claim 8, wherein:

the calibration light source further includes a temperature sensor which detects temperatures of the plurality of monitor sensors;

the memory stores a plurality of correspondence tables corresponding to a plurality of temperatures of the plurality of monitor sensors; and the spectral intensity distribution estimator estimates the relative spectral intensity distribution of the incandescent light source based on the output ratios of the plurality of the monitor sensors and the temperature detected by the temperature sensor.

10. A calibration system according to claim 1, further comprising:

a calculator which calculates a ratio of an emission-line intensity obtained from the outputs of the light receiver at a plurality of measurement wavelengths neighboring the emission-line wavelength to an output of the light receiver at a wavelength having no sensitivity at the emission-line wavelength;

a comparator which compares the calculated ratio with an initial value of the ratio stored beforehand; and a stray-light level estimator which estimates a change in a stray-light level of the spectral luminometer based on result of the comparator.

11. A calibration system according to claim 1, further comprising:

a calculator which calculates a half-width of the light receiver near the emission-line wavelength based on the outputs of the light receiver at a plurality of measurement wavelengths neighboring the emission-line wavelength;

a comparator which compares the calculated half-width with an initial value of the half-width stored beforehand; and a half-width estimator which estimates a change in a half-width of the spectral luminometer based on result of the comparator.

12. A calibration system according to claim 1, wherein the spectral luminometer further includes:

a tristimulus value calculator which calculates tristimulus values based on the outputs of the light receiver at the respective measurement wavelengths and weight coefficients for the respective wavelengths, the tristimulus value calculator correcting the weight coefficients according to the wavelength change amount and calculating the tristimulus values using the corrected weight coefficients.

13. A calibration system according to claim 12, wherein:

the spectral luminometer further includes a memory which stores weight coefficients for wavelength errors; and the tristimulus value calculator calculates the tristimulus values by selecting a weight coefficient corresponding to the wavelength change amount from the weight coefficients stored in the memory.

14. A calibration system according to claim 1, wherein the calibration light source includes:
a three-wavelength type fluorescent lamp; and
a band pass filter having a center wavelength near the emission-line wavelength of the fluorescent lamp.

15. A calibration system according to claim 14, wherein the band pass filter is operable to adjust the incident angle of a beam propagating from the fluorescent lamp.

16. A calibration system according to claim 14, wherein the calibration light source is incorporated in the spectral luminometer.

17. A calibration system according to claim 1, wherein the calibration light source includes a low-pressure mercury lamp.

18. A calibration system according to claim 1, wherein the calibration light source includes a spectrocolorimeter.

19. A calibration system for calibrating a spectral luminometer including a light receiver having an array of photoelectric conversion elements for receiving lights produced by dispersing an incident light in accordance with wavelengths and outputting electrical signals corresponding to light intensities of the respective received wavelength components, comprising:
a calibration light source which outputs emission lines having a known emission-line wavelength;
a wavelength estimator which estimates a wavelength of the emission-line output from relative outputs of the light receiver at a plurality of measurement wavelengths neighboring the emission-line wavelength when the spectral luminometer measures the emission-line output of the calibration light source; and
a wavelength calibrator which calibrates the wavelength of the spectral luminometer by estimating a wavelength change amount from a difference between the estimated wavelength of the emission-line output and the known emission-line wavelength.

20. A calibration system comprising:
a calibration light source including an incandescent light source;
a plurality of monitor sensors having different spectral sensitivities;
a spectral intensity distribution estimator which estimates a spectral intensity distribution of the incandescent light source from outputs of the plurality of monitor sensors;
a spectral luminometer which is to be calibrated, and provided with a light receiver having an array of photoelectric conversion elements for receiving lights produced by dispersing an incident light in accordance with wavelengths and outputting electrical signals corresponding to light intensities of the respective received wavelength components, and adapted to measure an output light of the incandescent light source;
a light receiver output estimator which estimates an output of the light receiver from the spectral intensity distribution estimated by the spectral intensity distribution estimator and the spectral sensitivities of the respective photoelectric conversion elements of the light receiver when the spectral luminometer measures the output light of the incandescent light source;
a calculator which calculates a ratio of the estimated output of the light receiver to an actual output of the light receiver for each photoelectric conversion element; and
a sensitivity calibrator which calibrates the sensitivity of the spectral luminometer based on the calculated ratio for each photoelectric conversion element.

21. A calibration system for calibrating a spectral luminometer including a light receiver having an array of photoelectric conversion elements for receiving lights-produced by dispersing an incident light in accordance with wavelengths and outputting electrical signals corresponding to light intensities of the respective received wavelength components, comprising:
a calibration light source including an incandescent light source;
a plurality of monitor sensors having different spectral sensitivities;
a spectral intensity distribution estimator which estimates a spectral intensity distribution of the incandescent light source from outputs of the plurality of monitor sensors;
a light receiver output estimator which estimates an output of the light receiver from the spectral intensity distribution estimated by the spectral intensity distribution estimator and the spectral sensitivities of the respective photoelectric conversion elements of the light receiver when the spectral luminometer measures the output light of the incandescent light source;
a calculator which calculates a ratio of the estimated output of the light receiver to an actual output of the light receiver for each photoelectric conversion element; and
a sensitivity calibrator which calibrates the sensitivity of the spectral luminometer based on the calculated ratio for each photoelectric conversion element.

22. A method for calibrating a spectral luminometer, comprising the steps of:
outputting emission lines having a known emission-line wavelength from a calibration light source;
measuring an emission-line output of the calibration light source by a spectral luminometer which is to be calibrated, and provided with a light receiver having an array of photoelectric conversion elements for receiving lights produced by dispersing an incident light in accordance with wavelengths and outputting electrical signals corresponding to light intensities of the respective received wavelength components;
estimating a wavelength of the emission-line output from relative outputs of the light receiver at a plurality of measurement wavelengths neighboring the emission-line wavelength; and
calibrating the wavelength of the spectral luminometer by estimating a wavelength change amount from a difference between the estimated wavelength of the emission-line output and the known emission-line wavelength.

23. A method for calibrating a spectral luminometer, comprising the steps of:
estimating a spectral intensity distribution of an incandescent light source from outputs of a plurality of monitor sensors;
measuring an output light of the incandescent light source by a spectral luminometer which is to be calibrated, and provided with a light receiver having an array of photoelectric conversion elements for receiving lights produced by dispersing an incident light in accordance with wavelengths and outputting electrical signals corresponding to light intensities of the respective received wavelength components;

estimating an output of the light receiver from the estimated spectral intensity distribution and the spectral sensitivities of the respective photoelectric conversion elements of the light receiver;

calculating a ratio of the estimated output of the light receiver to an actual output of the light receiver for each photoelectric conversion element; and calibrating the sensitivity of the spectral luminometer based on the calculated ratio for each photoelectric conversion element.

* * * * *